US012720370B2

(12) United States Patent
Tandekar et al.

(10) Patent No.: US 12,720,370 B2
(45) Date of Patent: Aug. 25, 2026

(54) AUTOMATIC UPGRADE SCHEDULING AND MANAGEMENT OF NETWORK RESOURCES

(71) Applicant: DISH Wireless L.L.C., Englewood, CO (US)

(72) Inventors: Dilip Tandekar, Herndon, VA (US); Gurpreet Sohi, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 283 days.

(21) Appl. No.: 18/656,203

(22) Filed: May 6, 2024

(65) Prior Publication Data

US 2025/0344108 A1 Nov. 6, 2025

(51) Int. Cl.
*H04W 28/26* (2009.01)
*H04L 41/16* (2022.01)

(52) U.S. Cl.
CPC ............. *H04W 28/26* (2013.01); *H04L 41/16* (2013.01)

(58) Field of Classification Search
None
See application file for complete search history.

(56) References Cited

U.S. PATENT DOCUMENTS 9,900,899 B2 * 2/2018 Jiang ................... H04W 72/542
10,383,000 B2 * 8/2019 Zhang ..................... H04L 47/11
11,399,290 B2 * 7/2022 Mahalingam .......... G06N 3/044
11,895,635 B2 * 2/2024 Sevindik ............. H04W 72/563
12,245,046 B2 * 3/2025 Montalvo ............. H04W 16/10
2024/0098576 A1 * 3/2024 Khalid .................... H04L 43/20
2024/0422557 A1 * 12/2024 Montalvo ............. G06N 20/00
2025/0294470 A1 * 9/2025 Duong ..................... G06N 3/04

OTHER PUBLICATIONS

Dilip Tandekar, Optimized Assignment of Network Resources, U.S. Appl. No. 18/656,111, filed May 6, 2024, pp. 1-63.
Dilip Tandekar, Tiered Assignment of Unutilized Network Resources, U.S. Appl. No. 18/656,263, filed May 6, 2024, pp. 1-64.

* cited by examiner

*Primary Examiner* — Saumit Shah
(74) *Attorney, Agent, or Firm* — Kilpatrick Townsend & Stockton LLP

(57) ABSTRACT

An apparatus comprises a memory and a processor communicatively coupled to one another. The processor may be configured to obtain telemetry data for at least one communication site of the one or more communication sites. Further, in response to obtaining the telemetry data, the processor may be configured to execute the machine learning algorithm to analyze the spectrum resource assignment information and the telemetry data based at least in part upon multiple communication conditions, generate multiple analysis results in response to analyzing the spectrum resource assignment information and the telemetry data, determine a release window based at least in part upon the analysis results, generate multiple spectrum assignment recommendations based at least in part upon the analysis results, and assign second resources in the communication spectrum for the one or more communication sites over a second period of time in accordance with the spectrum assignment recommendations.

20 Claims, 9 Drawing Sheets

AUTOMATIC UPGRADE SCHEDULING AND MANAGEMENT OF NETWORK RESOURCES

TECHNICAL FIELD

The present disclosure relates generally to assigning network resources in a communication system, and more specifically to a system and method to perform automatic scheduling and management of network resources.

BACKGROUND

Network resources are consumed to enable communication between one or more devices in a wireless communication system. In some wireless communications systems, communication operations between the devices may increase an amount of traffic in a network while draining a total number of available network resources. Certain communication operations may not be completed (e.g., dropped) in cases where network traffic demands usage of more network resources than the total number of network resources available in the network. These dropped communication operations may cause interruptions in service operations and/or communication operations exchanged between the devices.

SUMMARY OF THE DISCLOSURE

In one or more embodiments, systems and methods disclosed herein perform optimized assignment of network resources in a communication network. In particular, the systems may be configured improve spectrum utilization (e.g., communication spectrum utilization) in the communication network (e.g., a network communication network comprising multiple network resources). In particular, the systems may be configured to execute one or more machine learning (ML) algorithms and train one or more artificial intelligence (AI) commands to identify, monitor, and optimize assignments of a communication spectrum in the communication network. In some embodiments, the systems may be configured to proactively reassign resources in the communication spectrum over time based on ongoing and/or known consumption requirements/demand in the communication network as determined by the ML algorithms. In this regard, the communication spectrum may be optimized to improve utilization periodically and/or dynamically at one or more communication sites (e.g., cell sites comprising base stations and/or user equipment) over time. In some embodiments, network resources may be assigned differently for different communication sites such that different portions of the communication spectrum may be used at different communication sites. The communication spectrum utilization may be optimized to reach a communication spectrum efficiency of 4 bits per second(s) per hertz (Hz). In some embodiments, the systems may be configured to reach different efficiency levels based on a network capacity and/or one or more parameters (e.g., Key Performance Indicators (KPI)). The network resources may be space in the communication spectrum to perform one or more communication operations (e.g., comprising at least one power value and at least one frequency value). The network resources may be power resources, memory resources, and processing resources used as a basis for performing the communication operations of one or more devices in the communication sites.

In one or more embodiments, if the systems determine that the communication spectrum is underutilized, the systems may be configured to perform alternative spectrum assignments on a short-term basis. The systems may comprise a dynamic communication spectrum manager configured to give unused portions of the communication spectrum to alternative communication devices over a predefined amount of time. The systems may be configured to identify unutilized network resources in the communication spectrum and assign these network resources in accordance with a tiering level. In particular, the systems may be configured to execute one or more ML algorithms and train one or more AI commands identify, monitor, and assign unutilized portions of the communication spectrum in a communication system. The systems may be configured to proactively identify unused network resources in the communication spectrum based on ongoing and/or known consumption requirements/demand in the communication network as determined by the ML algorithms. In some embodiments, the systems may be configured to prioritize use of these (previously unused) resources in the event of a request for additional resources. In certain embodiments, these previously unused resources may be assigned to tenants based on a tiered system (e.g., based on tenant agreements). In other embodiments, the systems may be configured to perform tiering assignment of the previously unused resources to emergency services when these previously unused resources are needed due to an unexpected event (e.g., unaccounted by configuration and/or the ML algorithms; not part of routine traffic in the network). For example, the systems may be configured to dynamically route excess traffic in a moment that a communication site is down or in instances where an emergency event (e.g., weather event) requires additional traffic to be diverted away/towards one or more specific communication sites.

In one or more embodiments, the systems may be configured to perform automatic upgrade scheduling and management of network resources. The systems may be configured to determine a time to upgrade communication services in multiple communication sites. The systems may be configured to optimize network resources of the communication spectrum at each communication site location to reduce and/or eliminate downtime. Downtime in a specific communication site may negatively impact user devices in the specific communication site. In some embodiments, the systems may be configured to update and/or modify services at a given communication site by scheduling and/or managing new service releases over time. In cases in which releases of multiple services may be determined to impact one another, the systems may be configured to determine impacts of the multiple releases and schedule these releases to minimize an impact to the services in a given communication site and the rest of the communication network. In this regard, updates and/or modifications to services in a given communication site may be planned to reduce and/or eliminate downtime impact. The systems and methods may be configured to assign network resources of communication sites of a same size and/or different sizes. In this regard, size of a communication site may correspond to a number of user devices performing communication operations. In some embodiments, while a first number of user devices in a first communication site and a second number of user devices in a second communication site may not be equal to one another, a first number of network resources assigned to the first communication site may be equal to a second number of network resources assigned to the second communication site. The systems may be configured to categorize the communication spectrum usage at the communication sites. As determined via the ML algorithms, communication sites may be clustered to be modified and/or updated at once. The communication sites may be grouped in a cluster when the communication sites are neighboring one another (e.g., in a same vicinity) and/or comprise same services. In other embodiments, telemetry data associated with a given communication site may be obtained over time. The telemetry data may comprise information indicating services to upgrade. The systems may be configured to determine times to upgrade the services to eliminate and/or reduce adverse effects to a quality of service (QOS) of the given communication site.

In one or more embodiments, the systems and methods described herein are integrated into a practical application of dynamically allocating network resources to optimize spectrum assignments over one or more communication sites. In particular, the systems and methods may be configured to relocate and/or reassign network resources to communication operations in specific communication sites during one or more self-determined maintenance windows and/or based on requests for additional network resources in the given communication sites. The systems may be configured to dynamically determine a time in which the maintenance windows may be scheduled based on the analyses performed by the ML algorithms. Further, the systems may be configured to dynamically identify consumption of the network resources in one or more communication sites, identify unused network resources, and reallocate the unused network resources to maintain a predefined network efficiency. In other embodiments, the systems and methods are integrated into a practical application of relocating and/or reassigning network resources to specific communication sites outside the maintenance window. In this regard, the systems and methods may be configured to dynamically update the services in the communication sites by redistributing network assignments while the wireless communication system is online.

In addition, the system and method described herein are integrated into a technical advantage of increasing processing speeds in a computer system, because processors associated with the systems and methods prevent or eliminate waste of network resources. In particular, the systems and methods reduce memory usage and increase processing speed by dynamically assigning the network resources to communication sites configured to enable access to specific services in the wireless communication system. Further, the systems and methods described herein provide a technical advantage of increasing processing speeds in a computer system, because processors associated with the systems and methods comprise a ML algorithm that actively generates insights based on usage of the network resources in the communication sites. In some embodiments, the ML algorithm may provide dynamic access commands to access network resources in the communication spectrum based on some or all the insights obtained from the communication spectrum usage in the communication sites. As the ML algorithm is trained to account for many of the situations and conditions changing in the communication spectrum usage in the communication sites, multiple dynamic access commands are generated to relieve stress conditions in future processing operations (e.g., reduce and/or alleviate traffic) in the wireless communication system. In other embodiments, the systems and methods may be configured to generate real-time instructions to reassign and/or reallocate network resources within existing and/or new communication sites.

In one or more embodiments, the systems and methods may be performed by an apparatus, such as a server, communicatively coupled to multiple network components in a core network, one or more base stations in a radio access network, and one or more user equipment. Further, the systems may comprise a wireless communication system, which comprises the apparatus. In addition, the systems and methods may be performed as part of a process performed by the apparatus communicatively coupled to the network components in the core network. As a non-limiting example, the apparatus comprises a memory and a processor communicatively coupled to one another. The memory may be operable to store a machine learning algorithm configured to analyze and structure information about one or more resources assigned in a communication spectrum. The processor may be configured to monitor first resources assigned in the communication spectrum for one or more communication sites over a first period of time, obtain spectrum resource assignment information for the one or more communication sites, and obtain telemetry data for at least one communication site of the one or more communication sites. The spectrum resource assignment information may be representative of the first resources assigned in the communication spectrum over the first period of time. The telemetry data may comprise one or more characteristics relating to traffic in the at least one communication site. Further, in response to obtaining the telemetry data, the processor may be configured to execute the machine learning algorithm to analyze the spectrum resource assignment information and the telemetry data based at least in part upon multiple communication conditions and generate multiple analysis results in response to analyzing the spectrum resource assignment information and the telemetry data. The processor may be configured to receive a request to provide a service release to the at least one communication site. The request may comprise a tenant profile associated with the at least one communication site. The processor, in response to receiving the request, may further execute the machine learning algorithm to determine a release window based at least in part upon the analysis results, generate multiple spectrum assignment recommendations based at least in part upon the analysis results, and assign second resources in the communication spectrum for the one or more communication sites over a second period of time in accordance with the spectrum assignment recommendations. The release window may be a second period of time in which the at least one communication site operates at low traffic. The spectrum assignment recommendations may be associate a portion of the communication spectrum with the service release.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
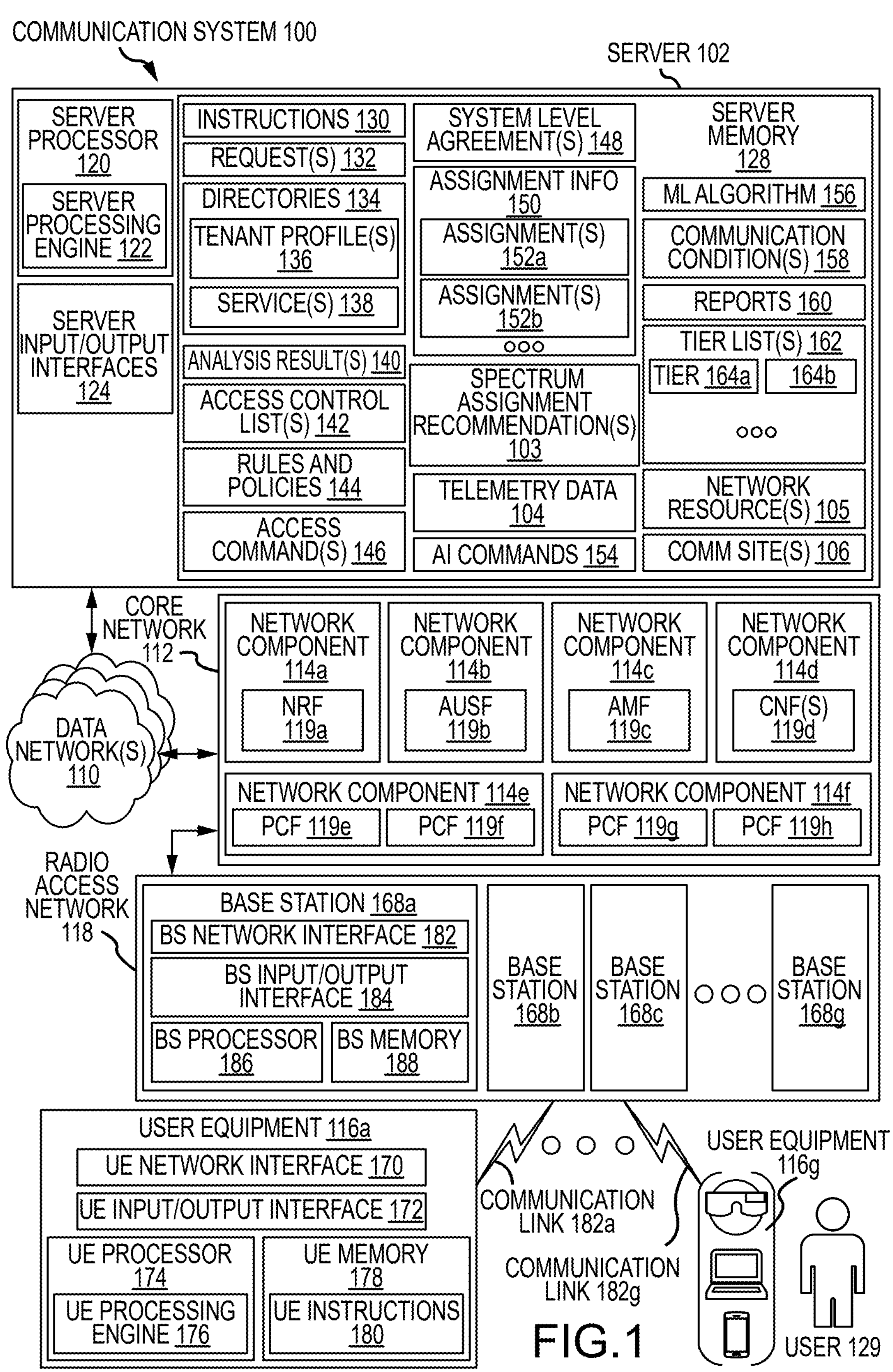
FIG. 1 illustrates an example communication system, in accordance with one or more embodiments.
Figure 2:
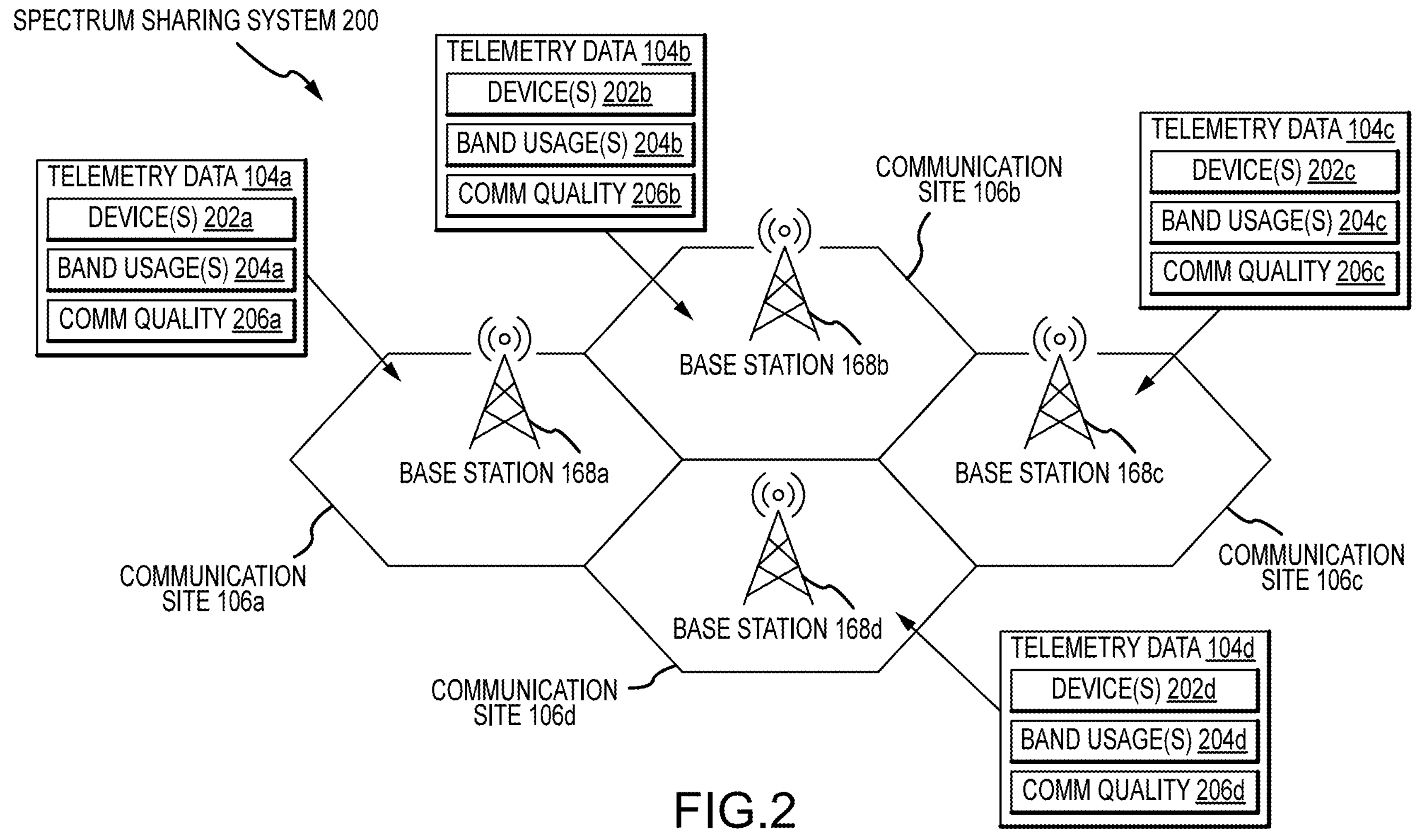
FIG. 2 illustrates an example spectrum sharing system, in accordance with one or more embodiments.
Figure 3A:
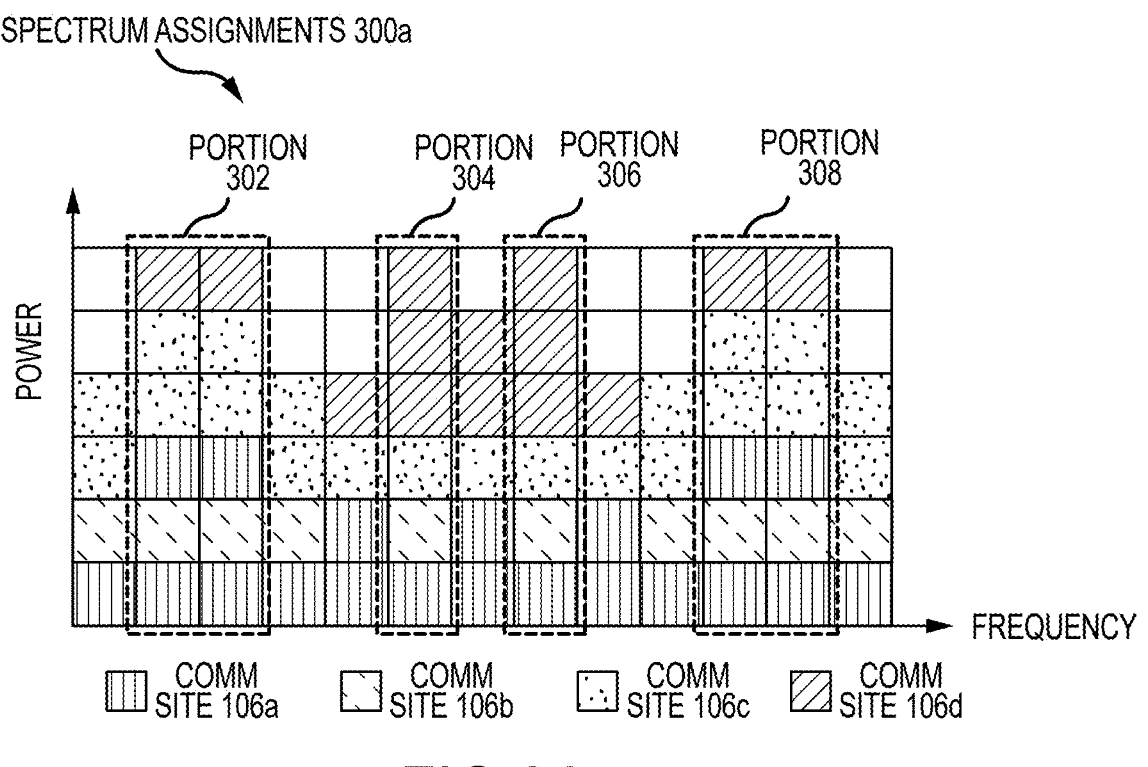
FIGS. 3A and 3B illustrate examples of spectrum assignments implemented in the communication system of FIG. 1, in accordance with one or more embodiments.
Figure 3B:
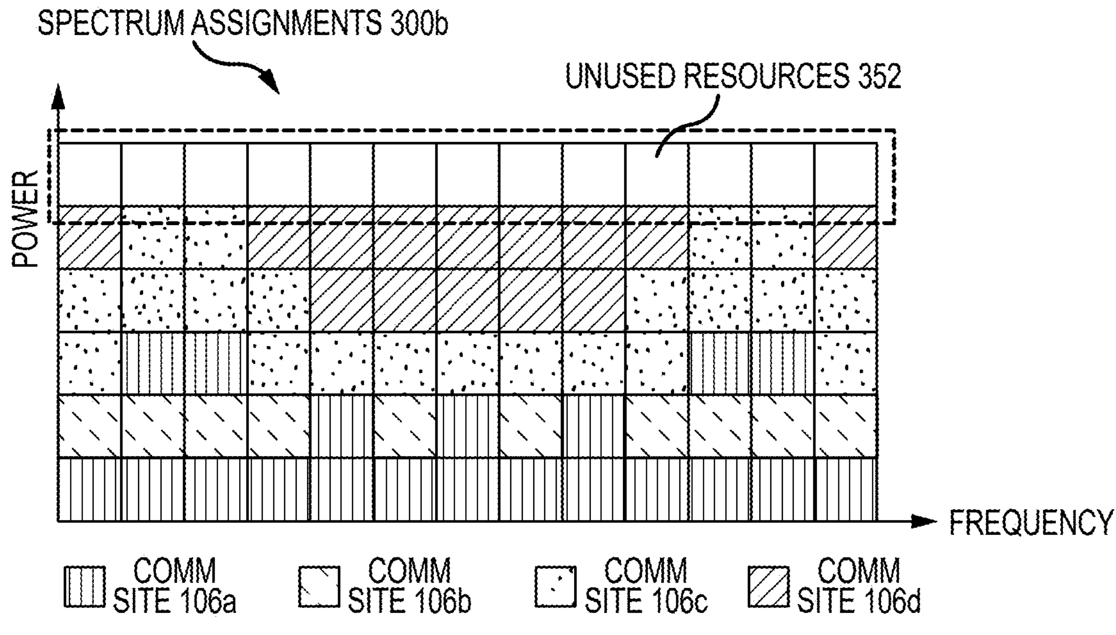
Figure 4:
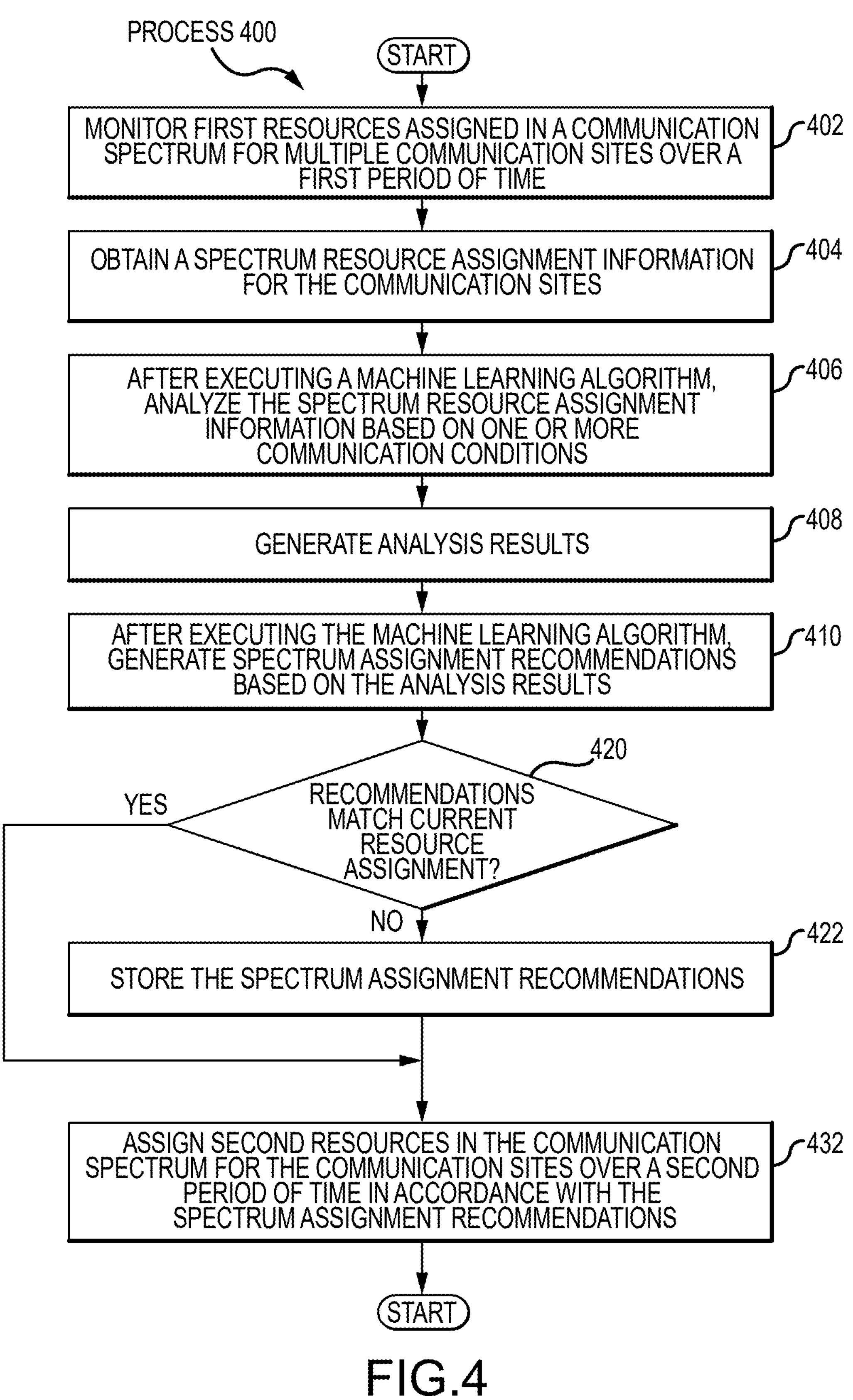
FIG. 4 illustrates an example flowchart of a method to perform optimized assignment of network resources, in accordance with one or more embodiments.
Figure 5A:
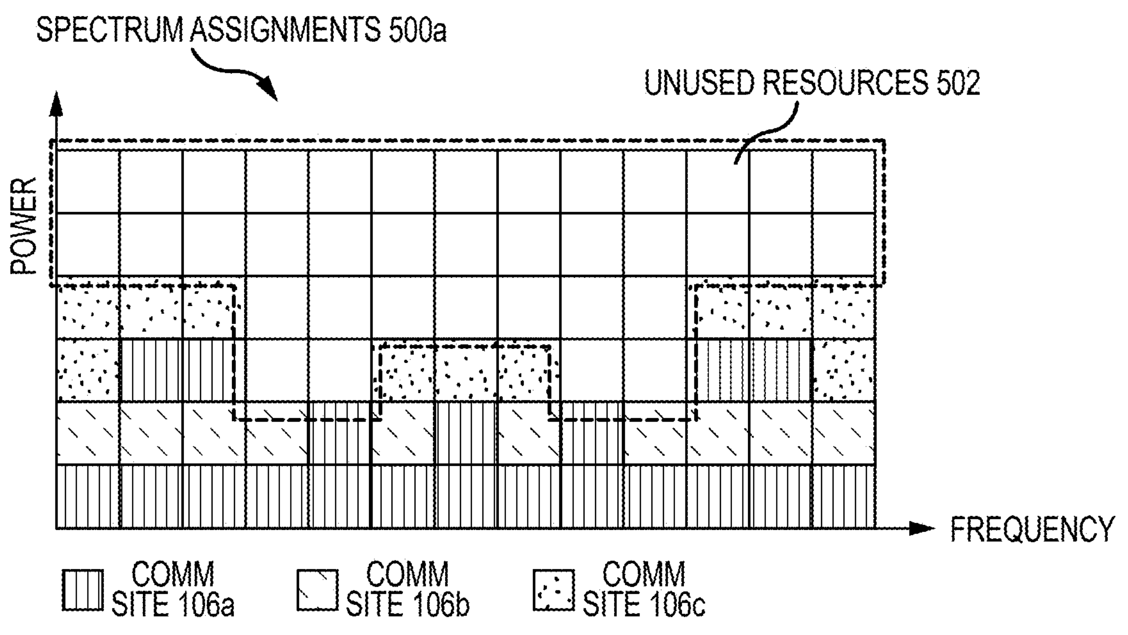
FIGS. 5A and 5B illustrate examples of spectrum assignments implemented in the communication system of FIG. 1, in accordance with one or more embodiments.
Figure 5B:
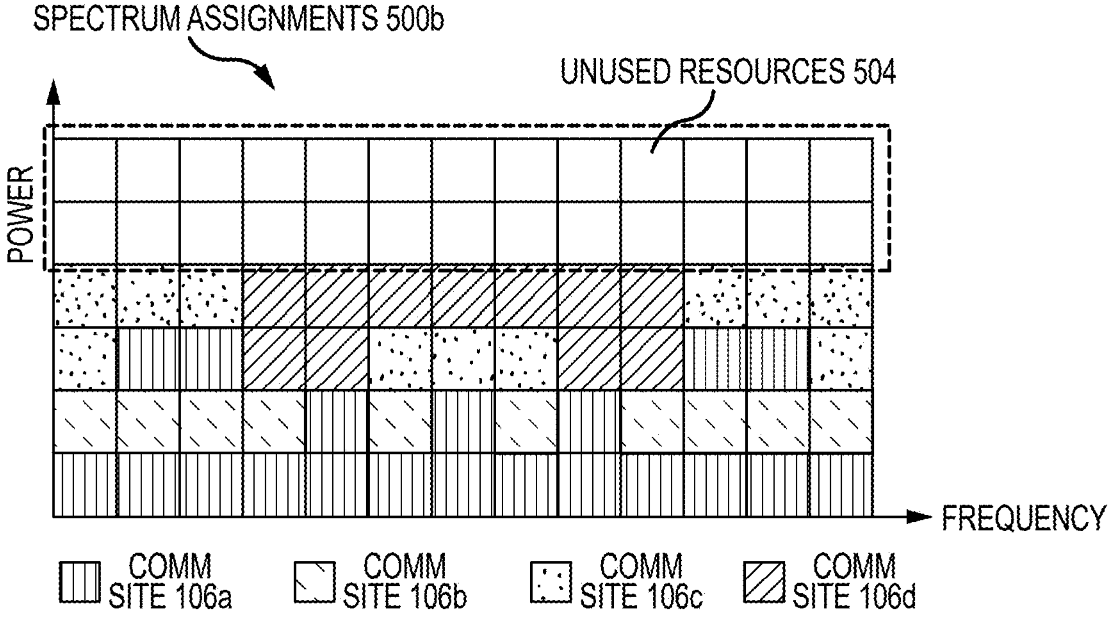
Figure 6:
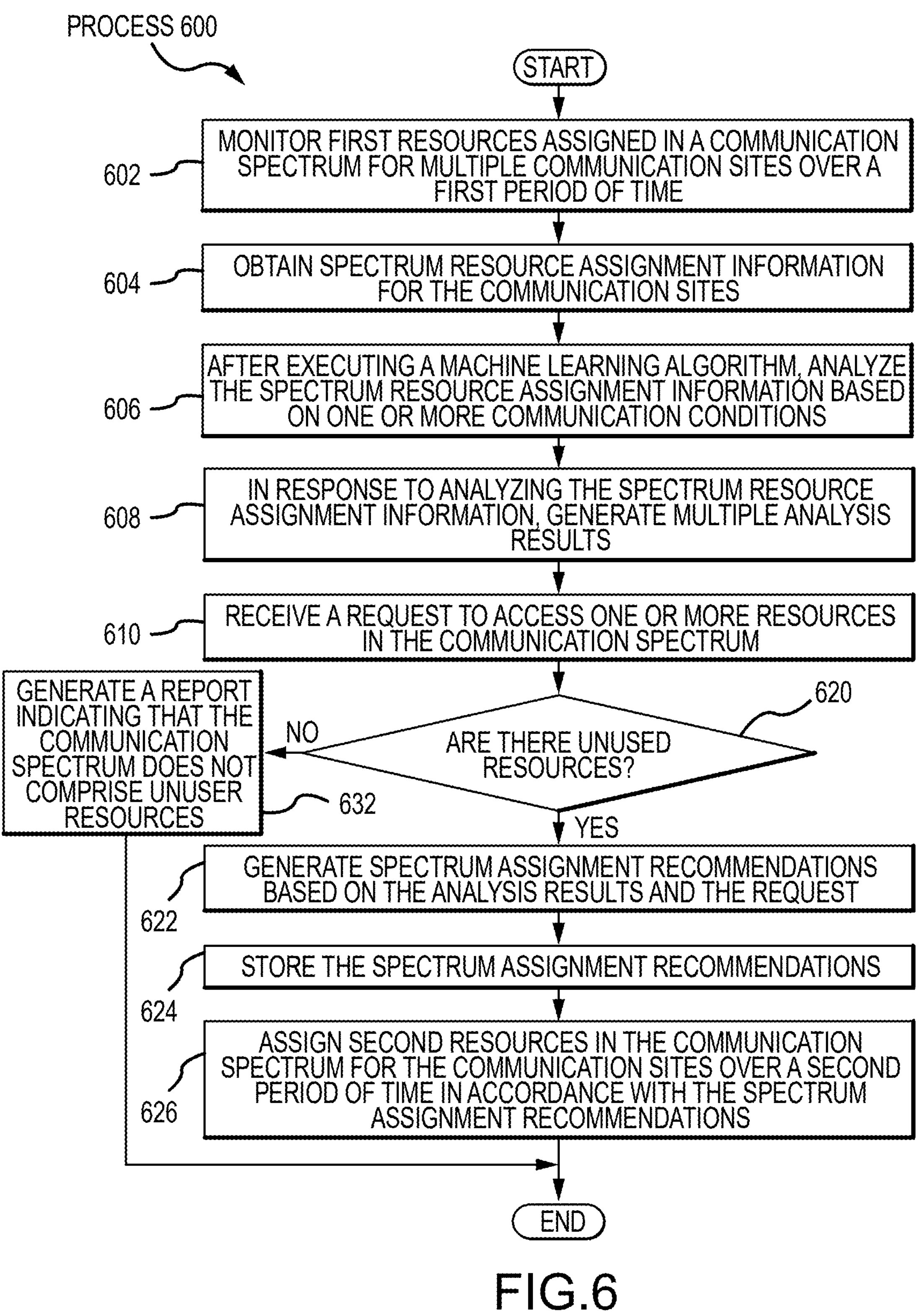
FIG. 6 illustrates an example flowchart of a method to perform tiered assignment of unutilized network resources, in accordance with one or more embodiments.

In one or more embodiments, systems and methods described herein are configured to dynamically assign network resources in a communication system. In one or more embodiments, FIG. 1 illustrates a communication system 100 in which a server 102 generates one or more spectrum assignment recommendations 103 based on collected telemetry data 104. FIG. 2 illustrates a spectrum sharing system 200 in which the communication system 100 of FIG. 1 is configured to implement the one or more spectrum assignment recommendations 103. FIGS. 3A and 3B illustrate spectrum assignments 300*a* and spectrum assignments 300*b*, respectively. The spectrum assignments 300*a* and the spectrum assignments 300*b* are implemented by the communication system 100 of FIG. 1. FIG. 4 illustrates a process 400 to perform optimized assignment of network resources by the communication system 100 of FIG. 1. FIGS. 5A and 5B illustrate spectrum assignments 500*a* and spectrum assignments 500*b*, respectively. The spectrum assignments 500*a* and the spectrum assignments 500*b* are implemented by the communication system 100 of FIG. 1. FIG. 6 illustrates a process 600 to perform tiered assignment of unutilized network resources by the communication system 100 of FIG. 1. FIGS. 7A, 7B, 7C, and 7D illustrate spectrum assignments 700*a*, spectrum assignments 700*b*, spectrum assignments 700*c*, and spectrum assignments 700*d*, respectively. The spectrum assignments 700*a*, the spectrum assignments 700*b*, the spectrum assignments 700*c*, and the spectrum assignments 700*d* are implemented by the communication system 100 of FIG. 1. FIG. 8 illustrates a process 800 to perform automatic scheduling and management of network resources by the communication system 100 of FIG. 1.

Communication System Overview

FIG. 1 illustrates a diagram of a communication system 100 (e.g., a wireless communication system) comprises a server 102 configured to generate the one or more spectrum assignment recommendations 103 based on the collected telemetry data 104, in accordance with one or more embodiments. The spectrum assignment recommendations 103 may be outputs configured to provide assignments of network resources 105 to one or more communication sites 106. The network resources 105 may be power resources, memory resources, and/or processing resources that are consumed in the communication system 100 to communicate in one or more data networks 110 using a communication spectrum. The network resources 105 may be power resources and/or frequency resources in the communication spectrum used as a basis to perform one or more communication operations in the communication sites 106. In FIG. 1, the server 102 is communicatively coupled to multiple devices in the communication system 100. While FIG. 1 shows the server 102 connected directly to the one or more data networks 110, the server 102 may be located inside a core network 112 as part of one or more network components 114*a*-114*f* (collectively, network components 114) in the core network 112.

In one or more embodiments, the communication system 100 comprises the user equipment 116*a*-116*g* (collectively, user equipment 116), a radio access network (RAN) 118, the core network 112, the one or more data networks 110, and the server 102. In some embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., frequency range FR1 Sub 6 GHz-less than 7.125 GHz). In this regard, the communication system 100 may comprise a large number of antennas. In some embodiments, the communication system may perform one or more communication operations associated with 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Service-Based Architecture

The communication system 100 may comprise a service-based architecture (SBA). The SBA may be an organization scheme in the core network 112 that comprises authentication, security, session management, and aggregation of traffic from end devices (e.g., the user equipment 116). In the SBA, the core network 112 may be representative of the 5G Core network and comprises multiple network components 114. In the SBA, the network components 114 are hardware (e.g., electronic circuitry with communication ports, a processor, and a memory) configured to perform one or more specific network functions (NFs) 119. Herein, the network components 114*a*-114*f* may be configured to perform one or more NFs 119. The NFs 119 maybe referenced using an NF-associated name. For example, a network component 114*a* configured to perform a network repository function (NRF) 119*a* may be referred to as an NRF (or a NRF network component). In another example, one of the network components 119*a*-119*h* may comprise a version of the server 102 with a server processor 120 configured to perform one or more specific NFs 119.

In some embodiments, individual network components 114 provide services or resources to other network components 114 performing different NFs 119. In other embodiments, each NF is a service provider that allocates one or more resources in communications inside or outside the network components 114 to provide one or more services. The services may be specific for each of the network components 114 and their respective NFs 119 instead of each of the network components 114 providing and consuming processing resources and memory resources to perform multiple NFs 119 in the core network 112. In 5G NR mobile networks, the SBA is defined by 3GPP to comprise one or more network components 114 configured to perform specific NFs 119 to provide control plane operations and user plane operations. In the 5G NR, the control plane comprises any part of the communication system 100 that controls operations and routing associated with data packets and forwarding operations. Further, in the 5G NR, the user plane comprises any part of the communication system 100 that carries user traffic operations.

In one or more embodiments, the SBA may be configured to provide access to network slices in accordance with specific application scenarios. A slice may be portions of a collection of NFs 119 that are combined into providing specific application resources. The application resources may be provided to one or more user equipment 116 simultaneously via web-based Application Programming Interfaces (APIs). The APIs may enable flexible and agile deployment of innovative services. An API may be a set of instructions that, when executed by a processor, perform modular or cloud-native functions and procedures allowing creation of applications (e.g., the aforementioned services) that access features or data of an operating system, application, or other service in the communication system 100.

Communication System Components

Server

The server 102 is generally any apparatus or device that is configured to process data, communicate with the data networks 110, one or more network components 114 in the core network 112, the RAN 118, and the user equipment 116. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 122. The operations of the server processing engine 122 are described further below. In some embodiments, the server 102 comprises the server processor 120, one or more server Input (I)/Output (O) interfaces 124 configured to communicate one or more communication spectrum assignments, and a server memory 128 communicatively coupled to one another. The server 102 may be configured as shown, or in any other configuration. As described above, the server 102 may be located in one of the network components 114 located in the core network 112 and may be configured to perform one or more NFs 119 associated with communication operations of the core network 112.

In one or more embodiments, the server processor 120, the server I/O interfaces 124, and the server memory 128 may be located at a same location or distributed over multiple remote locations separate from one another.

The server processor 120 may comprise one or more processors operably coupled to and in signal communication with the server I/O interfaces 124, and the server memory 128. The server processor 120 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 120 may be a programmable logic device, a microcontroller, a microprocessor, or any suitable combination of the preceding. The one or more processors in the server processor 120 are configured to process data and may be implemented in hardware or software executed by hardware. For example, the server processor 120 may be an 8-bit, a 16-bit, a 32-bit, a 64-bit, or any other suitable architecture. The server processor 120 may comprise an arithmetic logic unit (ALU) to perform arithmetic and logic operations, processor registers that supply operands to the ALU, and store the results of ALU operations, and a control unit that fetches software instructions such as server instructions 130 from the server memory 128 and executes the server instructions 130 by directing the coordinated operations of the ALU, registers and other components via the server processing engine 122. The server processor 120 may be configured to execute various instructions 130. For example, the server processor 120 may be configured to execute the server instructions 130 to perform functions or perform operations disclosed herein, such as some or all of those described with respect to FIGS. 1-8. In some embodiments, the functions described herein are implemented using logic units, FPGAs, ASICs, DSPs, or any other suitable hardware or electronic circuitry.

In the example of FIG. 1, the server I/O interfaces 124 may comprise one or more displays configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users 129. The one or more displays may be configured to present visual information to the one or more users 129 updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display, or a smartphone display configured to display the data representations.

In one or more embodiments, the server I/O interfaces 124 may be hardware configured to perform one or more communication operations. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

The server I/O interfaces 124 may comprise one or more server network interfaces that may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the user equipment 116, the Internet, an Intranet, a private network, a public network, a peer-to-peer network, the public switched telephone network, a cellular network, a local area network (LAN), a metropolitan area network (MAN), a wide area network (WAN), and a satellite network. The server network interface 124 may be configured to support any suitable type of communication protocol.

The server I/O interfaces 124 may comprise one or more administrator interfaces that may be user interfaces configured to provide access and control to of the server 102 to one or more users 129 via the user equipment 116 or electronic devices. The one or more users 129 may access the server memory 128 upon confirming one or more access credentials to demonstrate that access or control to the server 102 may be modified. In some embodiments, the one or more administrator interfaces may be configured to provide hardware and software resources to the one or more users 129. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., the one or more displays), a touchscreen, a touchpad, multiple keys, multiple buttons, a mouse, or any other suitable type of hardware that allow users 129 to view data or to provide inputs into the server 102. The server 102 may be configured to allow users 129 to send requests to one or more network components 114 or network. In some embodiments, the server I/O interfaces 124 may be configured to provide information allocating one or more of the network resources 105 in the communication spectrum to one or more electronic components in the communication system 100.

The server memory 128 may be volatile or non-volatile and may comprise a read-only memory (ROM), random-access memory (RAM), ternary content-addressable memory (TCAM), dynamic random-access memory (DRAM), and static random-access memory (SRAM). The server memory 128 may be implemented using one or more disks, tape drives, solid-state drives, and/or the like. The server memory 128 is operable to store the server instructions 130, one or more requests 132, one or more directories 134 comprising access to tenant profiles 136 associated with the one or more services 138 and the one or more of the NFs 119, one or more analysis results 140, one or more access control lists 142, one or more rules and policies 144, one or more access commands 146, one or more system level agreements (SLAs) 148, spectrum resource assignment information 150 comprising one or more assignments 152 (e.g., shown as representative one or more assignments 152*a* and one or more assignments 152*b*) indicating allocation of the one or more network resources 105 assigned to the one or more communication sites 106, the one or more spectrum assignment recommendations 103, the telemetry data 104, one or more artificial intelligence (AI) commands 154, an machine learning (ML) algorithm 156, one or more communication conditions 158, one or more reports 160, one or more tier lists 162 (e.g., shown as representative tier 164*a* and tier 164*b*), one or more lists indicating the network resources 105 available in the communication spectrum, and one or more lists indicating the one or more communication sites 106. In the server memory 128, the server instructions 130 may comprise commands and controls for operating one or more specific NFs 119 in the core network 112 when executed by the server processing engine 122 of the server processor 120.

In one or more embodiments, the requests 132 may be one or more communication signals configured to provide information and/or commands associated with one or more communication operations in the communication system 100. The requests 132 may be configured to trigger modifications to one or more of the assignments 152 of network resources 105. The requests 132 may be configured to trigger access to one or more network resources 105 in the communication spectrum associated with a corresponding communication site 106. The request 132 may comprise a tenant profile 136 comprising a priority level. The request 132 may be configured to trigger a modification to network resources 105 currently assigned to one or more communication sites 106. The request 132 may be configured to trigger one or more updates to services in a given communication site 106. The updates may be one or more service releases modifying services in the given communication site 106.

The directories 134 may be configured to store service-specific information, tenant-specific information, and/or user-specific information. The directories 134 may enable the server 102 to confirm tenant credentials to access one or more network components (e.g., one of the network components 114 configured to perform the NRF 119*a*, an authentication server function (AUSF) 119*b*, an access and management function (AMF) 119*c*, one or more cloud network functions (CNFs) 119*d*, a policy control function (PCF) 119*e*, a unified data repository (UDR) 119*f*, a session management function (SMF) 119*g*, one or more Service Communication Proxys (SCPs) 119*h*, or the like) in the core network 112. The directories 134 may be configured to store the tenant profiles 136 and a reference to the one or more services 138. The directories 134 may be configured to store provider-specific information and service-specific information. The provider-specific information may enable the server 102 to validate credentials associated with a specific provider (e.g., one of the NFs 119) against corresponding user-specific information and service-specific information. In some embodiments, the tenant profiles 136 may comprise lists of electronic devices (e.g., the user equipment 116) that are configured to receive resources allocated from the server 102. Each of the tenant profiles 136 may be associated with at least one corresponding communication site 106.

The analysis results 140 may be one or more results of one or more analyses performed by the server processor 120. The analyses may be performed as part of one or more operations triggered after executing the one or more instructions 130 (e.g., comprising executing the ML algorithm 156). The analysis results 140 may be structured data comprising information in the form of lists, tables, and/or databases among others.

In one or more embodiments, the access control list 142 (also referred to as ACL) may comprise rules that may allow or deny access to one or more of the entitlements that allow user equipment 116 to access the services 138. The rules and policies 144 may be security configuration commands or regulatory operations predefined by an organization or one or more users 129. The rules and policies 144 may be dynamically defined by the one or more users 129. The one or more rules and policies 144 may be one or more a policy as defined in the 3GPP standards. The SLAs 148 may be configured to define one or more levels of service expected by a tenant, laying out the metrics by which a given service is measured.

The access commands 146 are configured to establish one or more communication sessions between two or more network components 114 in the core network 112. The access commands 146 may be configured to establish one or more communication sessions between one or more network components 114 in the core network 112 and one of the user equipment 116. Each configuration command of the access commands 146 may establish a communication session between a first network component of the network components 114 comprising the server 102 and a second network component of the network components 114 based at least in part upon a first configuration command of the access commands 146. The access commands 146 may be routing and configuration information for reinstating or reestablishing communication sessions when a change is detected in the operations of the core network 112. For example, in response to losing a specific communication session established with the first access command, the server 102 may attempt to reinstate the specific communication session based at least in part upon a second access command. The access commands 146 may be dynamically or periodically updated from another of the network components 114 in the core network 112. Herein, communication sessions refer to communication signals exchanged between the server 102 and additional network components 114 in the core network 112. In some embodiments, the access commands 146 are provided to the server 102 from another of the network components 114 performing a specific NF. The access commands 146 may be configured to enable access of the one or more services 138.

In one or more embodiments, the access commands 146 may be a communication or a message configured to indicate a request for access of an application (via an API) or a service. In some embodiments, the access commands 146 may be a communication or a message configured to enable access to one or more entitlements in an application (via an API) or a service. The entitlements may be configured to provide one or more connectivity allowances (e.g., access) between the server 102, the user equipment 116, the one or more base stations 168, and the one or more of the network components 114. The entitlements may be assigned to specific departments or tenants. The entitlements may be predefined or dynamically defined in accordance with the rules and policies 144.

The spectrum resource assignment information 150 may comprise allocation information and/or commands to modify usage of the network resources 105. The spectrum resource assignment information 150 may comprise one or more assignments 152 (e.g., shown as representative one or more assignments 152*a* and one or more assignments 152*b*) corresponding to one or more corresponding communication sites 106. The assignments 152 may distribute or redistribute the network resources 105 to modify operations at one or more communication sites 106 (e.g., comprising the base stations 168 in the RAN 118). The assignments 152 may comprise modifications (e.g., increase, reduction, and/or replacement) of the network resources 105 distributed to one or more of the communication sites 106. The network resources 105 may comprise power resources associated with a power supply, processing resources associated with a processor, and/or memory resources associated with a memory. In one or more embodiments, the network resources 105 may be dynamically enabled at any given base station 168 to modify routing operations of communication sessions. The network resources 105 may be modified at the given base station 168 and/or user equipment 116 to prioritize assigning resources to maintain certain communication sessions. For example, the processing resources may be reassigned at a base station 168 from one communication session to another communication session. In some embodiments, the assignments 152 may be modified in response to detecting a change or modification caused for a specific type of resource. For example, the network resources 105 may be reassigned to prioritize communication sessions between emergency organizations in a predefined area. In this example, a first number of the network resources 105 assigned to a first communication session may be dynamically reduced by an amount while a second number of the network resources 105 may be dynamically increased by the same amount. The assignments 152 may be generated dynamically (e.g., on demand) or periodically.

In one or more embodiments, the assignments 152 cause additional communication sites 106 to be added to new communication spectrum operations and/or to be discarded and/or deactivated. The assignments 152 may cause network resources 105 used by a given communication site 106 to be modified. For example, the network resources 105 assigned for a college campus may be dynamically modified based on student attendance, campus events, weather changes, and the like. Further, the network resources 105 may be dynamically assigned, redistributed, and/or modified for different slices overlapping layers of the network resources 105. In some embodiments, the network resources 105 may be dynamically assigned, redistributed, and/or modified for different slice groups comprising one or more individual network slices overlapping in resource pools. The network resources 105 may be dynamically assigned, redistributed, and/or modified to increase, reduce, and/or maintain uplink (UL) and/or downlink (DL) operations in the communication sites 106. For example, the assignments 152 of network resources 105 to a given communication site 106 may be dynamically assigned, redistributed, and/or modified to increase, reduce, and/or maintain UL operations in the given communication site. Similarly, the assignments 152 of network resources 105 to the given communication site 106 may be dynamically assigned, redistributed, and/or modified to increase, reduce, and/or maintain DL operations in the given communication site.

In one or more embodiments, the spectrum assignment recommendation 103 may be configuration elements configured to associate a portion of the communication spectrum with one or more service releases. The spectrum assignment recommendation 103 may be data and/or commands derived from the analysis results 140. In this regard, the analysis results 140 may be further evaluated to generate the spectrum assignment recommendations 103. The spectrum assignment recommendations 103 may be configured to provide one or more suggestions to modify (e.g., add, maintain, and/or remove) allocation of the network resources 105 in a given communication site 106. The spectrum assignment recommendations 103 may be suggestions configured to be performed immediately (e.g., within a short period of time, such as a couple of seconds or less), over a period of time (e.g., periodically over a period of time), and/or at a scheduled time (e.g., at a later time). The spectrum assignment recommendations 103 may suggest implementation of one or more assignments 152 in the communication sites 106. The assignments 152 may be deployed simultaneously and/or in sequence. The assignments 152 suggested and/or provided by the spectrum assignment recommendation 103 may be configured as redundancies of one another or as standalone assignments in a wireless communication network. For example, two or more communication sites 106 may be configured to perform one or more similar operations.

The spectrum assignment recommendation 103 may be recommendations presented to modify allocation of the network resources 105 used by the network components 114, the base stations 168, and/or the user equipment 116 based on the analysis results 140. The spectrum assignment recommendation 103 may comprise one or more dynamic suggestions to modify the spectrum resource assignment information 150. In one or more embodiments, the dynamic suggestions are the one or more assignments 152 configured to control operations of the server 102, the network components 114, the base stations 168, and/or the user equipment 116. The assignments 152 may be optimized configuration commands configured to dynamically provide control information to perform one or more of the operations based at least in part upon the analysis results 140 and the telemetry data 104.

In some embodiments, the telemetry data 104 may comprise information related to a performance of the communication sites 106 over a period of time. The telemetry data 104 may comprise information representative of a number of user equipment 116 and/or a number of base stations 168 exchanging communication operations in a given communication site 106. The telemetry data 104 may comprise information representative of devices 202, band usages 204, and communication quality 206 among others in each of the communication sites 106. The devices 202, the band usages 204, and the communication quality 206 will be discussed in more detail in reference to FIG. 2. The telemetry data 104 may be a basis to train the ML algorithm 156. The telemetry data 104 may be current data indicating current performance and/or operations in one or more of the communication sites 106. The telemetry data 104 may be historical data indicating previous performance and/or operations in one or more of the communication sites 106.

The communication conditions 158 may be one or more configuration parameters configured to provide guidelines and/or information to inform the analyses performed by the server processor 120. The communication conditions 158 may be updated periodically over time. The communication conditions 158 may be updated dynamically over time. The communication conditions 158 may be guidelines to analyze current spectrum resource assignment information 150 and the telemetry data 104.

The tier lists 162 comprise one or more priority levels for one or more communication sessions established in the communication system 100. In one or more embodiments, the server 102 may be configured to control, monitor, and regulate the communication sessions in accordance with one or more of the tier lists 162. The tier lists 162 may be modified over time such that new tier lists 162 may be added or removed, as-needed dynamically or periodically. The tier lists 162 may be modified immediately upon a triggering event caused by an admin console access. The tier lists 162 may be modified periodically upon entering a triggering event during a maintenance window in which the communication sites 106 may operate at low traffic. In some embodiments, the server 102 may dynamically manage spectra for all three tiers 164 with first priority for user equipment 116 in a first tier 156A and second priority for user equipment 116 in a second tier 156B. In some embodiments, to use the spectrum, the server 102 may use the tenant profiles 136 to assign one or more resources (e.g., network resources 105) and deploy corresponding access points. For example, one of the user equipment 116 may request use of spectrum channels via a connection request. In turn, the server 102 (e.g., acting as at least a part of an administrator) may receive connectivity data in the request 132 indicating latitude, longitude, and height into a database (e.g., the server memory 128). In some embodiments, the server 102 may determine whether the requested spectrum is available. The server 102 may then assign spectrum channels and grant authority to operate in the channels in accordance with a priority level (e.g., depending on the tiers 164). In this regard, the server 102 may authorize allocation of appropriate transmission power levels and allocation of channel resources.

In one or more embodiments, the ML algorithm 156 may be executed by the server processor 120 to evaluate the usage in the network resources 105 in the communication sites 106. Further, the ML algorithm 156 may be configured to interpret and transform information associated with the requests 132 and the telemetry data 104 into structured data sets and subsequently stored as files or tables. The ML algorithm 156 may cleanse, normalize raw data, and derive intermediate data to generate uniform data in terms of encoding, format, and data types. The ML algorithm 156 may be executed to run user queries and advanced analytical tools on the structured data. The ML algorithm 156 may be configured to generate the one or more AI commands 154 based on current usage of the resources 107 in the communication sites 106, and/or existing instructions 130. In turn, the server processor 120 may be configured to generate the assignments 152 dynamically based on the outputs of the ML algorithm 156. The AI commands 154 may be parameters that modify the allocation and/or assignment of the network resources 105 in the assignments 152. The AI commands 154 may be combined with the existing instructions 130 to create the dynamic instructions and/or configuration commands. In one or more embodiments, the dynamic instructions and/or configuration commands may be dynamically generated updates for the existing instructions 130.

In one or more embodiments, the ML algorithm 156 may be configured to generate one or more ML models that preemptively modify the assignments 152 based at least in part upon the usage of the network resources 105 in the communication sites 106. In some embodiments, the server 102 may be configured to generate a library of ML models categorized in accordance with one or more categories and/or characteristics. The one or more categories and/or characteristics may comprise morphology, spectrum deployed, traffic utilization, services offered, broadband, voice, mission critical, strict SLAs, and the like. One or more of the ML models may be configured with attributes that are priority elements for each of the services performed at the communication cell, air interface capacity per cell, and/or numbers of network resources 105 associated with a specific Quality of Service (QOS). In some embodiments, the ML models may be created and maintained based at least in part upon one or more different characteristics. After a period of time, the ML algorithm 156 following an existing ML model may be configured to generate one or more AI commands 154 that trigger changes in the allocation of the network resources 105.

User Equipment

In one or more embodiments, each of the user equipment 116 may be any computing device configured to communicate with other devices, such as the server 102, other network components 114 in the core network 112, databases, and the like in the communication system 100. Each of the user equipment 116 may be configured to perform specific functions described herein and interact with one or more network components 114 in the core network 112 via one or more base stations **168*a*-168*g* (collectively, base stations 168). Examples of user equipment 116** comprise, but are not limited to, a laptop, a computer, a smartphone, a tablet, a smart device, an IoT device, a simulated reality device, an augmented reality device, or any other suitable type of device.

In one or more embodiments, referring to the user equipment **116*a* as a non-limiting example of the user equipment 116, the user equipment 116*a* may comprise a user equipment (UE) network interface 170, a UE I/O interface 172, a UE processor 174 executing operations via a UE processing engine 176, and a UE memory 178 comprising one or more instructions 180 configured to be executed by the UE processor 174. The UE network interface 170 may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 170** may be configured to support any suitable type of communication protocol.

The UE I/O interface 172 may be hardware configured to perform one or more communication operations. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment **116*a* may comprise capabilities for voice communication, mobile broadband services (e.g., video streaming, navigation, and the like), or other types of applications. In this regard, the UE I/O interface 172 of the user equipment 116*a*** may communicate using machine-to-machine (M2M) communication, such as machine-type communication (MTC), or another type of M2M communication.

In some embodiments, the user equipment **116*a* is communicatively coupled to one or more of the base stations 168 via one or more communication links 190*a*-190*g* (e.g., collectively, communication links 190). The user equipment 116*a* may be a device with cellular communication capability such as a mobile phone, a hand-held device, a computer, a laptop, a tablet, a smart watch or other wearable device, or virtually any type of wireless device. In some applications, the user equipment 116** may be referred to as a UE, UE device, or terminal.

The UE processor 174 may comprise one or more processors operably coupled to and in signal communication with the UE network interface 170, the UE I/O interface 172, and the UE memory 178. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as UE instructions 180 from the UE memory 178 and executes the UE instructions 180 by directing the coordinated operations of the ALU, registers, and other components via a UE processing engine 176. The UE processor 174 may be configured to execute various instructions. For example, the UE processor 174 may be configured to execute the UE instructions 180 to implement functions or perform operations disclosed herein, such as some or all of those described with respect to FIGS. 1-8. In some embodiments, the functions described herein are implemented using logic units, FPGAS, ASICs, DSPs, or any other suitable hardware or electronic circuitry.

Radio Access Network

In one or more embodiments, the RAN 118 enables the user equipment 116 to access one or more services in the core network 112. The one or more services may be a mobile telephone service, a Short Message Service (SMS) message service, a Multimedia Message Service (MMS) message service, an Internet access, cloud computing, or other types of data services. The RAN 118 may comprise the base stations 168 in signal communication with the user equipment 116 via the one or more communication links 190. Each of the base stations 168 may service the user equipment **116*a*-116*g*. In some embodiments, while multiple base stations 168 are shown connected to multiple user equipment 116 via the communication links 190, one or more additional base stations 168 may be connected to one or more additional user equipment 116 via one or more additional communication links 190. For example, the base stations 168*a*-168*g* may exchange connectivity signals with the user equipment 116*a* via the communication link 190*a*. In another example, the base station 168*g* may exchange connectivity signals with the user equipment 116*g* via the communication link 190*g*. In yet another example, the base stations 168 may service some user equipment 116** located within a geographic area serviced by one of the bases.

In one or more embodiments, referring to the base station **168*a* as a non-limiting example of the base station 168, the base station 168*a* may comprise a base station (BS) network interface 182, a BS I/O interface 184, a BS processor 186, and a BS memory 188. The BS network interface 182 may be any suitable hardware or software (e.g., executed by hardware) to facilitate any suitable type of communication in wireless or wired connections between the core network 112 and the user equipment 116. These connections may comprise, but not be limited to, all or a portion of network connections coupled to additional network components 114 in the core network 112, other base stations 168, the user equipment 116, the Internet, an Intranet, a private network, a public network, a peer-to-peer network, the public switched telephone network, a cellular network, a LAN, a MAN, a WAN, and a satellite network. The BS network interface 182** may be configured to support any suitable type of communication protocol.

The BS I/O interface 184 may be hardware configured to perform one or more communication operations. The BS I/O interface 184 may comprise one or more antennas as part of a transceiver, a receiver, or a transmitter for communicating using one or more wireless communication protocols or technologies. In some embodiments, the BS I/O interface 184 may be configured to communicate using, for example, 5G NR or LTE using at least some shared radio components. In other embodiments, the BS I/O interface 184 may be configured to communicate using single or shared RF bands. The RF bands may be coupled to a single antenna, or may be coupled to multiple antennas (e.g., for a MIMO configuration) to perform wireless communications. In some embodiments, the base station 168*a* may allocate resources in accordance with one or more routing and configuration operations obtained from the core network 112. In some embodiments, resources may be allocated to enable capabilities in the user equipment 116 for voice communication, mobile broadband services (e.g., video streaming, navigation, and the like), or other types of applications.

In some embodiments, the base station 168*a* is communicatively coupled to one or more of the user equipment 116 via the one or more communication links 190. In some applications, the base stations 168 may be referred to as a BS, evolved Node B (eNodeB or eNB), a next generation Node B, gNodeB, gNB, or terminal.

The BS processor 186 may comprise one or more processors operably coupled to and in signal communication with the BS network interface 182, the BS I/O interface 184, and the BS memory 188. The BS processor 186 is any electronic circuitry, including, but not limited to, state machines, one or more CPU chips, logic units, cores (e.g., a multi-core processor), FPGAs, ASICs, or DSPs. The BS processor 186 may be a programmable logic device, a microcontroller, a microprocessor, or any suitable combination of the preceding. The one or more processors in the BS processor 186 are configured to process data and may be implemented in hardware or software executed by hardware. For example, the BS processor 186 may be an 8-bit, a 16-bit, a 32-bit, a 64-bit, or any other suitable architecture. The BS processor 186 comprises an ALU to perform arithmetic and logic operations, processor registers that supply operands to the ALU, and store the results of ALU operations, and a control unit that fetches software instructions (not shown) from the BS memory 188 and executes the software instructions by directing the coordinated operations of the ALU, registers, and other components via a processing engine (not shown) in the BS processor 186. The BS processor 186 may be configured to execute various instructions. For example, the BS processor 186 may be configured to execute the software instructions to implement functions or perform operations disclosed herein, such as some or all of those described with respect to FIGS. 1-8. In some embodiments, the functions described herein are implemented using logic units, FPGAs, ASICs, DSPs, or any other suitable hardware or electronic circuitry.

Core Network

The core network 112 may be a network configured to manage communication sessions for the user equipment 116. In one or more embodiments, the core network 112 may establish connections between user equipment 116 and a particular data network 110 in accordance with one or more communication protocols. The core network 112 may be a multi-core network 112 configured to comprise multiple cores. In this regard, the multi-core network may comprise multiple NFs 119 in each core. In the example of FIG. 1, the core network 112 comprises the network component 114*a* configured to perform the NRF 119*a*, the network component 114*b* configured to perform the AUSF 119*b*, the network component 114*c* configured to perform the AMF 119*c*, the network component 114*d* configured to perform the CNFs 119*d*, the network component 114*e* configured to perform the PCF 119*e* and the UDR 119*f*, and the network component 114*f* configured to perform the SMF 119*g* and the SCPs 119*h*. Herein, as a non-limiting example, while the NRF 119*a* is associated with the network component 114*a*, the core network 112 may comprise multiple network component 114 performing the NRF 119*a*. For example, a Unified Data Management (UDM) may be part of a core.

In some embodiments, the NRF 119*a* may comprise a service registration procedure that accesses the one or more databases to store or retrieve routing and configuration information associated with one or more network components 114 in the core network 112. The NRF 119*a* may access the database to discover services offered by other networks or other network components 114 with service discovery procedures and service authorization procedures. The NRF 119*a* may maintain a list of available NFs operations available in the core network 112 and any network components 114 associated with performing a given NF 119. The NRF 119*a* may also performs registration and discovery of service such that different NFs 119 may find each other via APIs. As an example, when the SMF 119*g* is registered to the NRF 119*a*, the SMF 119*g* is discoverable by the AMF 119*c* when the user equipment 116 attempts to access a given service type via the SMF 119*g*. In other embodiments, the NFs 119 may be connected via a communication bus to all other additional network elements in the core network 112. In the SBA, the NRF 119*a* may enable access between the user equipment 116 and the services offered via the NFs 119.

In one or more embodiments, the network components 114*d* performing the one or more CNFs 119*d* may be configured to operate multiple services associated with one or more services 138, while dynamically directing network traffic within the core network 112. In some embodiments, the network component 114*f* performing the SMF 119*g* may be configured to manage one or more communication sessions established between network components 114 of the core network 112, allocate and manage resource allocation routing for the user equipment 116, user plane selection, QoS and configuration enforcements for the control plane, service registration, discovery, establishment, and the like. In other embodiments, the network component 114*c* performing the AMF 119*c* may be configured to manage mobility, registration, connections, and overall access for the other network components 114 in the core network 112. The AMF 119*c* may act as an entry point for connections between the user equipment 116 and a given service. In yet other embodiments, the network component 114*f* performing the one or more SCPs 119*h* may be configured to provide a point of entry for a cluster of NFs 119 in the core network 112 to the user equipment 116 once the user equipment 116 are discovered by the NRF 119*a*. This allows the SCPs 119*h* to be delegated discovery points in the core network 112. The network component 114*b* performing the AUSF 119*b* may be configured to share performing of some of the aforementioned operations with a Unified Data Management (UDM) (not shown). In this regard, the AUSF 119*b* may be configured to perform authentication processes while the UDM manages user data for any other processes in the core network 112. In other embodiments, the UDM may receive requests for subscriber data from the SMF 119*g*, the AMF 119*c*, and the AUSF 119*b* before providing any services 138. The AUSF 119*b* may be implemented in one of the network components 114 configured to enable the AMF 119*c* to authenticate the user equipment 116. The network component 114*e* performing the PCF 119*e* may be configured to provide a policy control framework in which the rules and policies 144 are implemented in accordance with one or more application guidelines. In some embodiments, the PCF 119*e* may apply policy decisions to services provided, accessing subscription information, and the like to control behavior associated with the core network 112. The network component 114*f* performing the UDR 119*f* configured to operate as a centralized data repository for subscription data, subscriber policy data, session information, context information, and application states. In some embodiments, the UDR 119*f* may be configured to provide API integrations with other NFs 119 to retrieve subscriber subscription and policy data. The UDR 119*f* may notify other NFs 119 of changes in subscriber data, supports real-time or batch (e.g., bulk) data access provisioning and subscriber data provisioning, and manages service parameters and application data for advanced applications.

In some embodiments, the core network 112 enables the user equipment 116 to communicate with the server 102, or another type of device, located in a particular data network 110 or in signal communication with a particular data network 110. The core network 112 may implement a communication method that does not require the establishment of a specific communication protocol connection between the user equipment 116 and one or more of the data networks 110. The core network 112 may include one or more types of network devices (not shown), which may perform different NFs 119.

In some embodiments, the core network 112 may include a 5G NR or an LTE access network (e.g., an evolved packet core (EPC) network) among others. In this regard, the core network 112 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular QoS class, type of service, or particular user associated with one or more of the user equipment 116. For example, a logical network may be a Mobile Private Network (MPN) configured for a particular organization. In this example, when the user equipment 116*a* is configured and activated by a wireless network associated with the RAN 118, the user equipment 116*a* may be configured to connect to one or more particular network slices (i.e., logical networks) in the core network 112. Any logical networks or slices that may be configured for the user equipment 116*a* may be configured using one of the network components 114 of FIG. 1 performing a Network Slice Selection Function (NSSF) that may store a subscription profile associated with the user equipment 116*a*, in a network component operating as a Unified Data Management (UDM). Further, when the user equipment 116*a* may request a connection to a particular logical network or slice, the user equipment 116*a* may send a request to the network component performing the AMF 119*c*. The AMF 119*c* may provide a list of allowed logical networks or slices to the user equipment 116*a*. The user equipment 116*a* may then request a Packet Data Unit (PDU) connection with one or more of the provided logical networks or slices.

Data Networks

In the example system 100 of FIG. 1, the data networks 110 may facilitate communication within the communication system 100. This disclosure contemplates that the data networks 110 may be any suitable network operable to facilitate communication between the server 102, the core network 112, the RAN 118, and the user equipment 116. The data networks 110 may include any interconnecting system capable of transmitting audio, video, signals, data, messages, or any combination of the preceding. The data networks 110 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Operational Flows

FIG. 2 illustrates an example of a spectrum sharing system 200, in accordance with one or more embodiments. In the example of FIG. 2, the spectrum sharing system 200 comprises multiple base stations (e.g., representatively, the base station 110*a*, the base station 110*b*, a base station 110*c*, and a base station 110*d*). The spectrum sharing system 200 may be configured to share the communication spectrum while performing one or more communication operations. In FIG. 2, the base station 110*a* is in a communication site 106*a*, the base station 110*b* is in a communication site 106*b*, the base station 110*c* is in a communication site 106*c*, and the base station 110*d* is in a communication site 106*d*. As described above, each of the communication sites 106 may have corresponding telemetry data 104. In some embodiments, the telemetry data 104 may be information about devices 202, one or more band usages 204 in the communication spectrum, and/or communication quality 206 (e.g., QoS) in a given communication site 106. The telemetry data 104*a* of the communication site 106*a* comprises the devices 202*a*, the band usages 204*a*, and the communication quality 206*a*. The telemetry data 104*b* of the communication site 106*b* comprises comprising the devices 202*b*, the band usages 204*b*, and the communication quality 206*b*. The telemetry data 104*c* of the communication site 106*c* comprises the devices 202*c*, the band usages 204*c*, and the communication quality 206*c*. The telemetry data 104*d* of the communication site 106*d* comprises the devices 202*d*, the band usages 204*d*, and the communication quality 206*d*.

In one or more embodiments, the spectrum sharing system 200 comprises base stations 1168 that exchange signals comprising data and commands with one another. The spectrum sharing system 200 may be configured to perform one or more communication operations with one another and/or additional communication sites 106 (not shown). In some embodiments, the spectrum sharing system 200 comprises communication sites 106 that may communicate with one or more of the other communication sites. For example, the devices 202*a* in the communication site 106*a* may communicate with devices 202*b* of the communication site 106*b* without communicating with devices 202*d* of the communication site 106*d*.

The devices 202 may comprise one or more user equipment 116 and/or one or more base stations 168. The communication sites 106 may comprise more or less base stations 168 than those shown in FIG. 2. The band usages 204 may comprise information representative of one or more communication capabilities in the communication sites 106.

For example, the band usages 204*a* of the communication site 106*a* may indicate that the devices 202*a* comprise 5G communication capabilities and/or 6G communication capabilities. In some embodiments, the band usages 204*a* may indicate a current use of the communication spectrum and/or historical use of the communication spectrum. The communication quality 206*a* of the communication site 106*a* may be configured to indicate an overall QoS in the communication site 106*a* and/or individual QoS information for each of the devices 202*a*.

Optimized Assignment of Network Resources

FIGS. 3A and 3B illustrate examples of assignments 152 of multiple network resources 105 in the communication spectrum, in accordance with one or more embodiments. The communication spectrum is represented by a plane in a vertical axis indicative of power levels and a horizontal axis indicative of frequency levels. In the example of FIG. 3A, the spectrum assignments 300*a* represent current network resources 105 assigned to multiple frequencies at one or more power levels in the communication spectrum at a first time. In the example of FIG. 3B, the spectrum assignments 300*b* represent new network resources 105 assigned to multiple frequencies at one or more power levels in the communication spectrum at a second time. Each square shown in the spectrum assignments 300*a* and the spectrum assignments 300*b* may be representative of a network resource 105 comprising a power parameter and a frequency parameter. The multiple network resources 105 may be assigned to representative communication sites 182*a*-182*d*. The spectrum assignments 300*a* and 300*b* comprise 13 frequency levels and 6 power levels. The network resources 105 in the spectrum assignments 300*a* and 300*b* may be assigned for the communication sites 182*a*-182*d*.

In one or more embodiments, the server 102 may be configured to execute the ML algorithm 156 and train one or more AI commands 154 to identify, monitor, and optimize assignments 152 of the communication spectrum in the communication system 100. In some embodiments, the server 102 may be configured to proactively reassign allocation of network resources 105 in the communication spectrum over time based on ongoing and/or known consumption requirements/demand in the communication system 100 as determined by the ML algorithm 156. In this regard, the communication spectrum may be optimized to improve utilization periodically and/or dynamically at one or more communication sites 106 (e.g., cell sites comprising base stations 168 and/or user equipment 116) over time. In some embodiments, the network resources 105 may be assigned differently for different communication sites 106 such that different portions of the communication spectrum may be used at different communication sites 106. The communication spectrum utilization may be optimized to reach a communication spectrum (spectral) efficiency of 4 bits per second(s) per hertz (Hz). In some embodiments, the server 102 may be configured to reach different efficiency levels based on a network capacity and/or one or more parameters (e.g., Key Performance Indicators (KPI)). The network resources 105 may be space in the communication spectrum to perform one or more communication operations (e.g., comprising at least one power value and at least one frequency value). The network resources 105 may be power resources, memory resources, and processing resources used as a basis for performing the communication operations of one or more devices 202 in the communication sites 106.

In FIG. 3A, as a non-limiting representative example, the spectrum assignments 300*a* comprise one or more assignments 152 of network resources 105 at a first time. The spectrum assignments 300*a* may be a current approach for assigning network resources 105 to the spectrum sharing system 200 of FIG. 2. In this regard, the spectrum assignments 300*a* show multiple portions 302-308 (e.g., a portion 302, a portion 304, a portion 306, and a portion 308) where traffic in the communication spectrum is higher at certain frequency levels.

In FIG. 3B, as a non-limiting representative example, the spectrum assignments 300*b* comprise one or more assignments 152 of network resources 105 at a second time. The spectrum assignments 300*b* may be a suggested approach (e.g., as part of the spectrum assignment recommendations 103) for assigning network resources 105 to the spectrum sharing system 200 of FIG. 2. In this regard, the spectrum assignments 300*b* may eliminate the portions 302-308 described in reference to FIG. 3A where traffic in the communication spectrum is higher at certain frequency levels. Instead, the spectrum assignments 300*b* comprise a sustained spectral efficiency of allocated network resources 105 at a maintained power level and freeing up multiple unused resources 352.

In some embodiments, the server 102 may be configured to evaluate the spectrum assignments 300*a* in FIG. 3A via the telemetry data 104*a*-104*d* at a first time. The server 102 may be configured to identify the portions 302-308 where the communication spectrum comprises large power consumption over certain frequency levels. The server 102 may be configured to generate one or more analysis results 140 after evaluating the telemetry data 104 in accordance with one or more ML models of the ML algorithm 156. Herein, the server 102 may be configured to generate one or more spectrum assignment recommendations 103 based on the analysis results 140. The server 102 spectrum assignment recommendations 103 may comprise one or more suggested assignments 152 to be implemented in the communication spectrum at a second time. Further, the spectrum assignments 300*b* in FIG. 3B may be one or more assignments 152 implemented in the communication spectrum to eliminate the portions 302-308 with high traffic. Instead, the spectrum assignments 300*b* comprises unused resources 352 that cover an entire power level of the communication spectrum. In this embodiment, the server 102 optimizes allocation of the network resources 105 to reduce high traffic portions 302-308 in the communication spectrum.

Example Process to Implement Optimized Assignment of Network Resources

FIG. 4 illustrates an example flowchart of a process 400 to dynamically implement optimized assignment of network resources 105, in accordance with one or more embodiments. In one or more embodiments, the process 400 comprises operations 402-432. Modifications, additions, or omissions may be made to the process 400. The process 400 may include more, fewer, or other operations than those shown below. For example, operations may be performed in parallel or in any suitable order. While at times discussed as the server 102, one or more of the user equipment 116, components of any of thereof, or any suitable system or components of the communication system 100 may perform one or more operations of the process 400. For example, one or more operations of the process 400 may be implemented, at least in part, in the form of server instructions 130 of FIG. 1, stored on non-transitory computer readable media, tangible media, machine-readable media (e.g., server memory 128 of FIG. 1 operating as a non-transitory computer readable medium) that when run by one or more processors (e.g., the server processor 120 of FIG. 1) may cause the one or more processors to perform operations described in operations 402-432 of the process 400. The process 400 may be performed during a maintenance window or outside a maintenance window in which the communication site 106 may operate at low traffic.

The process 400 starts at operation 402, where the server 102 monitors first network resources 105 assigned in a communication spectrum for multiple communication sites 106 (e.g., one or more of the communication sites 106*a*-106*d* described in reference to FIG. 2) over a first period of time. At operation 404, the server 102 is configured to obtain spectrum resource assignment information 150 for the communication sites 106*a*-106*d*. The spectrum resource assignment information 150 may be representative of the network resources 105 assigned in the communication spectrum over the first period of time. At operation 406, the server 102 is configured to analyze the spectrum resource assignment information 150 based on one or more communication conditions 158 after executing an ML algorithm 156. At operation 408, the server 102 is configured to generate analysis results 140. At operation 410, the server 102 is configured to generate one or more spectrum assignment recommendations 103 based on the analysis results 140 after executing the ML algorithm 156.

The process 400 continues to operation 420, where the server 102 is configured to determine whether the spectrum assignment recommendations 103 comprise one or more new assignments 152 that at least partially match current assignments 152. If the server 102 determines that the spectrum assignment recommendations 103 does not comprise one or more new assignments 152 that at least partially match current assignments 152 (i.e., NO), the process 400 proceeds to operation 422. At operation 422, the server 102 store the spectrum assignment recommendations 103. If the server 102 determines that the spectrum assignment recommendations 103 comprise one or more new assignments 152 that do not match any current assignments 152 (i.e., YES), the process 400 proceeds to operation 432.

The process 400 may conclude at operation 432. At operation 432, the server 102 is configured to assign second network resources 105 in the communication spectrum for the communication sites 106*a*-106*d* over a second period of time in accordance with the spectrum assignment recommendations 103.

Tiered Assignment of Unutilized Network Resources

FIGS. 5A and 5B illustrate examples of assignments 152 of multiple network resources 105 in the communication spectrum, in accordance with one or more embodiments. The communication spectrum is represented by a plane in a vertical axis indicative of power levels and a horizontal axis indicative of frequency levels. In the example of FIG. 5A, the spectrum assignments 500*a* represent current network resources 105 assigned to multiple frequencies at one or more power levels in the communication spectrum at a first time. In the example of FIG. 5B, the spectrum assignments 500*b* represent new network resources 105 assigned to multiple frequencies at one or more power levels in the communication spectrum at a second time. Each square shown in the spectrum assignments 500*a* and the spectrum assignments 500*b* may be representative of a network resource 105 comprising a power parameter and a frequency parameter. The multiple network resources 105 may be assigned to representative communication sites 182*a*-182*d*. The spectrum assignments 500*a* and 500*b* comprise 13 frequency levels and 6 power levels. The network resources 105 in the spectrum assignments 500*a* and 500*b* may be assigned for the communication sites 182*a*-182*d*.

In one or more embodiments, if the server 102 determines that the communication spectrum is underutilized, the server 102 may be configured to perform alternative spectrum assignments 152 on a short-term basis. The server 102 may perform dynamic communication spectrum management configured to give unused portions of the communication spectrum to alternative communication devices 202 over a predefined amount of time. The server 102 may be configured to identify unutilized network resources in the communication spectrum and assign these network resources 105 in accordance with a tiering level (e.g., the tiers 164). In particular, the server 102 may be configured to execute the ML algorithm 156 and train the one or more AI commands 154 to identify, monitor, and assign unutilized portions of the communication spectrum in the communication system 100. The server 102 may be configured to proactively identify unused network resources in the communication spectrum based on ongoing and/or known consumption requirements/demand in the communication system 100 as determined by the ML algorithm 156. In some embodiments, the server 102 may be configured to prioritize use of these (previously unused) network resources 105 in the event of a request 132 for additional network resources 105 from a given tenant. In certain embodiments, these previously unused resources may be assigned to tenants based on a tiered system (e.g., based on tenant agreements). In other embodiments, the systems may be configured to perform tiering assignment of the previously unused resources to emergency services when these previously unused resources are needed due to an unexpected event (e.g., unaccounted by configuration and/or the ML algorithm 156; not part of routine traffic in the communication system 100). For example, the server 102 may be configured to dynamically route excess traffic in a moment that a communication site is down or in instances where an emergency event (e.g., weather event) requires additional traffic to be diverted away/towards one or more specific communication sites.

In FIG. 5A, as a non-limiting representative example, the spectrum assignments 500*a* comprise one or more assignments 152 of network resources 105 at a first time. The spectrum assignments 500*a* may be a current approach for assigning network resources 105 to the spectrum sharing system 200 of FIG. 2. In this regard, the spectrum assignments 500*a* show multiple unused resources 502. As described above, the unused resources 502 may be network resources 105 that are not currently assigned in the communication spectrum.

In FIG. 5B, as a non-limiting representative example, the spectrum assignments 500*b* comprise one or more assignments 152 of network resources 105 at a second time. The spectrum assignments 500*b* may be a suggested approach (e.g., as part of the spectrum assignment recommendations 103) for assigning network resources 105 to the spectrum sharing system 200 of FIG. 2. In this regard, the spectrum assignments 500*b* show that the network resources 105 are reassigned to use some of the unused resources 502. In this regard, a request 132 to assign additional network resources 105 may have been received from the communication site 182*d*. In the spectrum assignments 500*b*, there remain a new set of unused resources 504.

In some embodiments, the server 102 may be configured to evaluate the spectrum assignments 500*a* in FIG. 5A via the telemetry data 104*a*-104*d* at a first time. The server 102 may be configured to evaluate whether the communication network is underused. The server 102 may be configured to generate one or more analysis results 140 after evaluating the telemetry data 104 in accordance with one or more ML models of the ML algorithm 156. Herein, the server 102 may be configured to generate one or more spectrum assignment recommendations 103 based on the analysis results 140. The server 102 spectrum assignment recommendations 103 may comprise one or more suggested assignments 152 to be implemented in the communication spectrum at a second time. Herein, the server 102 may be configured to assign some or all of the unused resources 502 to a device 202 and/or a communication site 106 requesting new network resources 105. Further, the spectrum assignments 500*b* in FIG. 5B may be one or more assignments 152 implemented in the communication spectrum to assign new network resources 105 to the devices 202 and/or communication site 106 requesting additional network resources 105.

Example Process to Implement Tiered Assignment of Unutilized Network Resources

FIG. 6 illustrates an example flowchart of a process 600 to dynamically implement tiered assignment of unutilized network resources 502, in accordance with one or more embodiments. In one or more embodiments, the process 600 comprises operations 602-632. Modifications, additions, or omissions may be made to the process 600. The process 600 may include more, fewer, or other operations than those shown below. For example, operations may be performed in parallel or in any suitable order. While at times discussed as the server 102, one or more of the user equipment 116, components of any of thereof, or any suitable system or components of the communication system 100 may perform one or more operations of the process 600. For example, one or more operations of the process 600 may be implemented, at least in part, in the form of server instructions 130 of FIG. 1, stored on non-transitory computer readable media, tangible media, machine-readable media (e.g., server memory 128 of FIG. 1 operating as a non-transitory computer readable medium) that when run by one or more processors (e.g., the server processor 120 of FIG. 1) may cause the one or more processors to perform operations described in operations 602-632 of the process 600. The process 600 may be performed during a maintenance window or outside a maintenance window in which the communication sites 106 may operate at low traffic.

The process 600 starts at operation 602, where the server 102 monitors first network resources 105 assigned in a communication spectrum for multiple communication sites 106 (e.g., one or more of the communication sites 106*a*-106*d* described in reference to FIG. 2) over a first period of time. At operation 604, the server 102 is configured to obtain spectrum resource assignment information 150 for the communication sites 106*a*-16*d*. At operation 606, the server 102 is configured to analyze the spectrum resource assignment information 150 based on one or more communication conditions 158 after executing an ML algorithm 156. At operation 608, the server 102 is configured to generate multiple analysis results 140 in response to analyzing the spectrum resource assignment information 150. At operation 610, the server 102 is configured to receive a request 132 to access one or more network resources 105 in the communication spectrum.

The process 600 continues to operation 620, where the server 102 is configured to determine whether the communication spectrum over the first period of time comprises any unallocated/unassigned (e.g., unused) network resources 105 after executing the ML algorithm 156. If the server 102 determines that the communication spectrum over the first period of time comprises any unallocated/unassigned (e.g., unused) network resources 105 (i.e., YES), the process 600 proceeds to operation 622. At operation 622, the server 102 generates spectrum assignment recommendations 103 based on the analysis results and the request 132. At operation 624, the server 102 stores the spectrum assignment recommendations 103. The process 600 proceeds to operation 626. The process 600 may conclude at operation 626. At operation 626, the server 102 is configured to assign second network resources 105 in the communication spectrum for the communication sites 106*a*-106*d* over a second period of time in accordance with the spectrum assignment recommendations 103.

If the server 102 determines that the communication spectrum over the first period of time does not comprise any unallocated/unassigned (e.g., unused) network resources 105 (i.e., NO), the process 600 proceeds to operation 632. The process 600 may conclude at operation 632. At operation 632, the server 102 is configured to generate a report 160 indicating that the communication spectrum does not comprise unused resources.

Automatic Upgrade Scheduling and Management of Network Resources

Figure 7A:
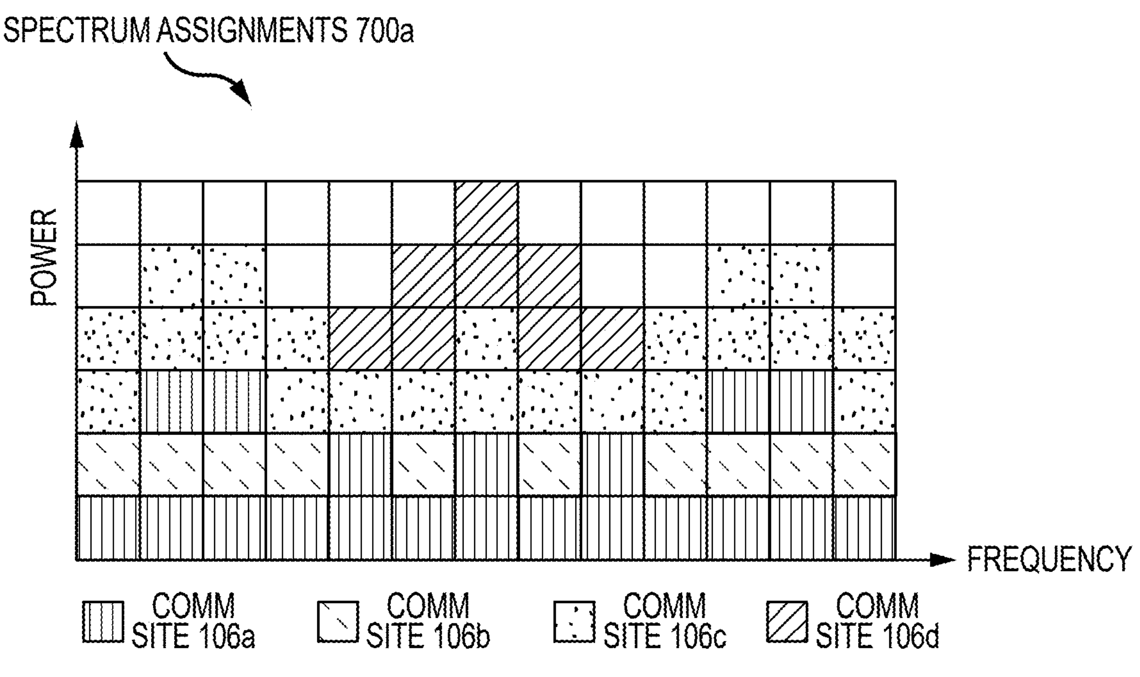
FIGS. 7A-7D illustrate examples of spectrum assignments implemented in the communication system of FIG. 1, in accordance with one or more embodiments.
Figure 7B:
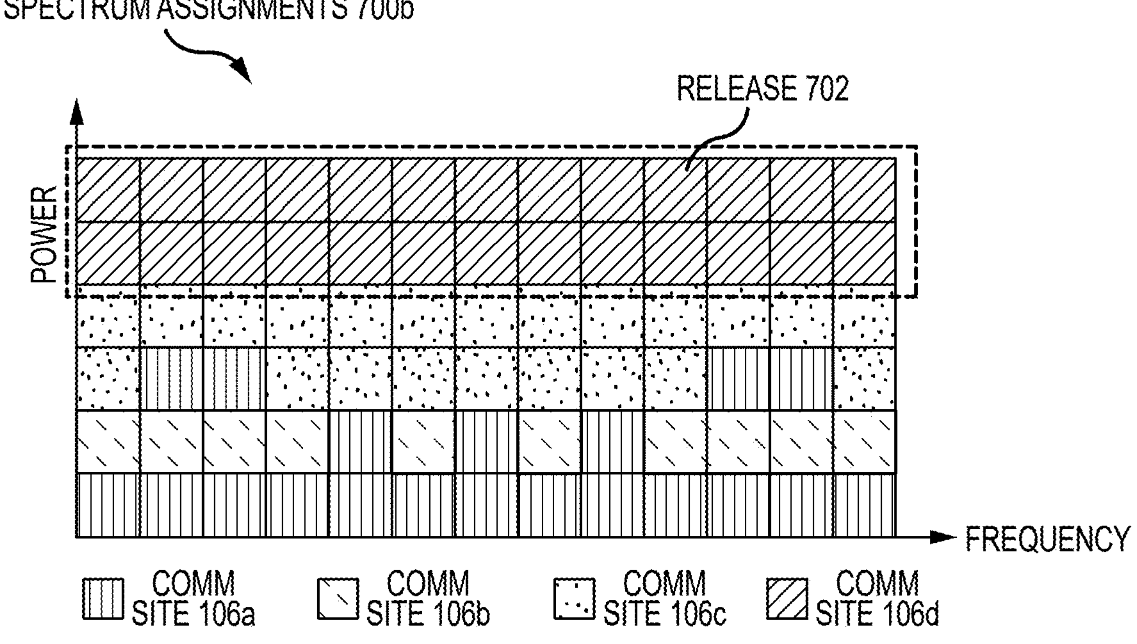
Figure 7C:
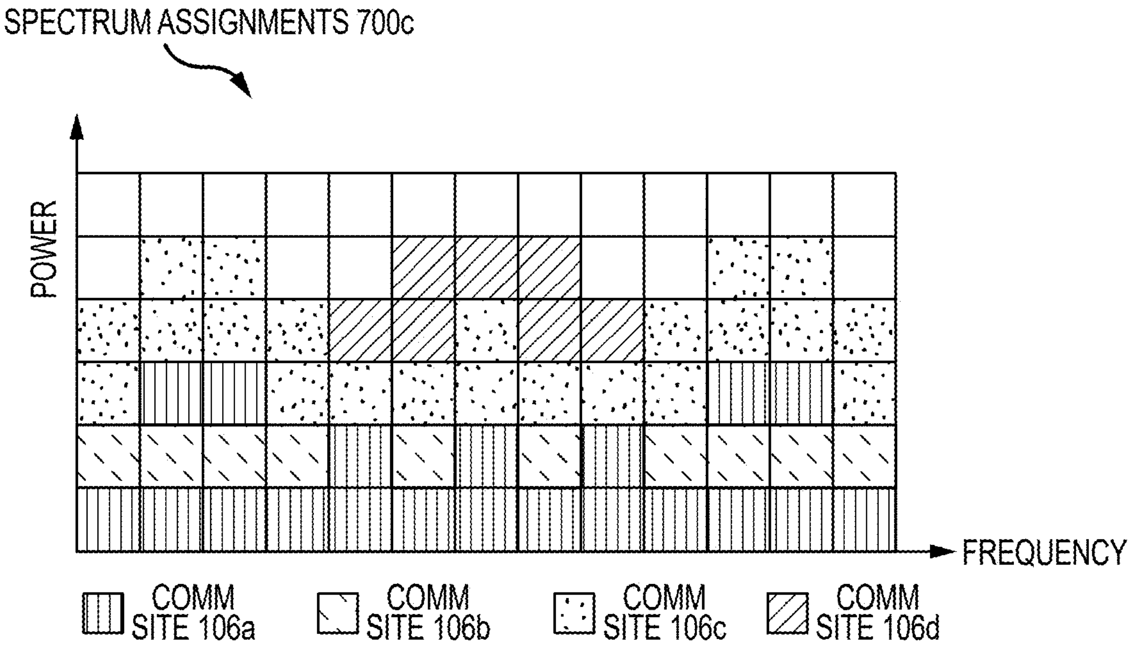
Figure 7D:
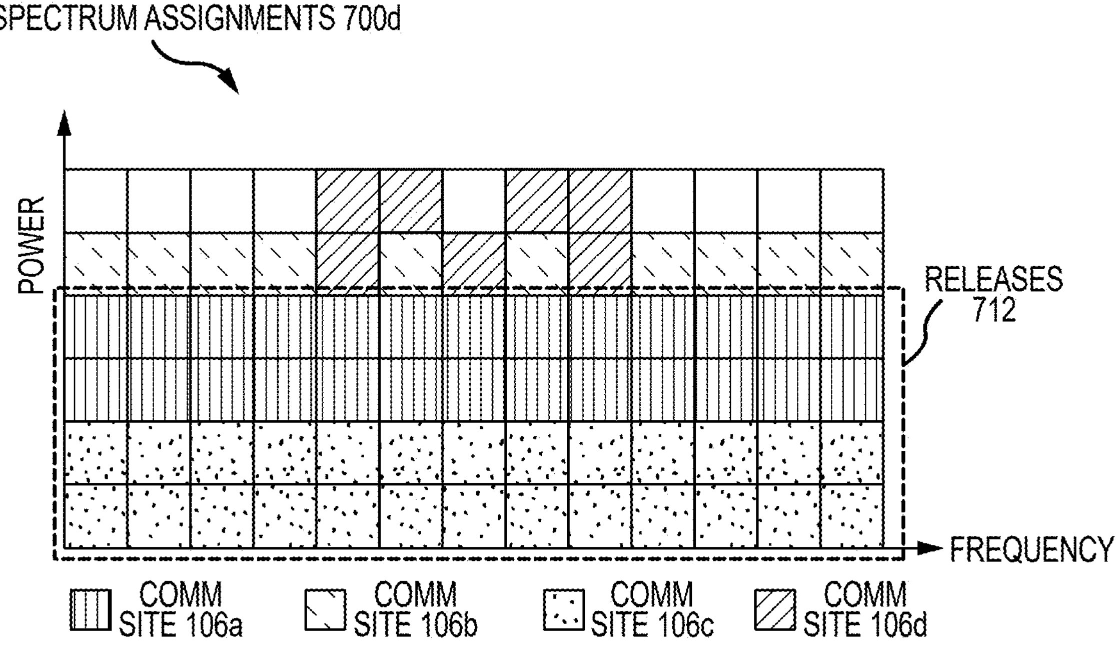
Figure 8:
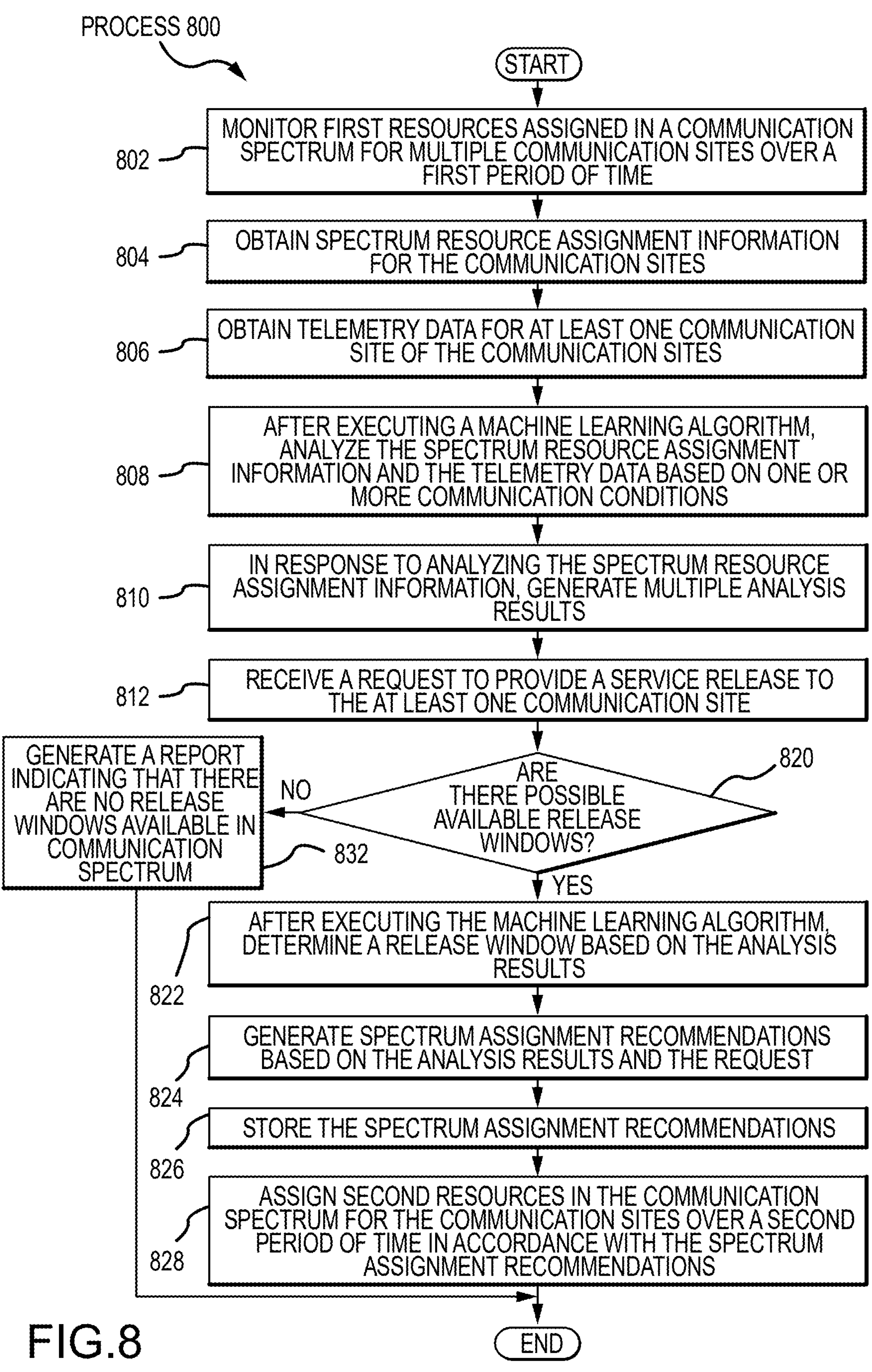
FIG. 8 illustrates an example flowchart of a method to perform automatic upgrade scheduling and management of network resources, in accordance with one or more embodiments.

FIGS. 7A-7D illustrate examples of assignments 152 of multiple network resources 105 in the communication spectrum, in accordance with one or more embodiments. The communication spectrum is represented by a plane in a vertical axis indicative of power levels and a horizontal axis indicative of frequency levels. In the example of FIG. 7A, the spectrum assignments 700*a* represent current network resources 105 assigned to multiple frequencies at one or more power levels in the communication spectrum at a first time. In the example of FIG. 7B, the spectrum assignments 700*b* represent new network resources 105 assigned to multiple frequencies at one or more power levels in the communication spectrum at a second time. In the example of FIG. 7C, the spectrum assignments 700*c* represent current network resources 105 assigned to multiple frequencies at one or more power levels in the communication spectrum at a third time. In the example of FIG. 7D, the spectrum assignments 700*d* represent new network resources 105 assigned to multiple frequencies at one or more power levels in the communication spectrum at a fourth time. Each square shown in the spectrum assignments 700*a*, the spectrum assignments 700*b*, the spectrum assignments 700*c*, and the spectrum assignments 700*d* may be representative of a network resource 105 comprising a power parameter and a frequency parameter. The multiple network resources 105 may be assigned to representative communication sites 182*a*-182*d*. The spectrum assignments 300*a* and 300*b* comprise 13 frequency levels and 6 power levels. The network resources 105 in the spectrum assignments 700*a*-700*d* may be assigned for the communication sites 182*a*-182*d*.

In one or more embodiments, the server 102 may be configured to perform automatic upgrade scheduling and management of the network resources 105. The server 102 may be configured to determine a time to upgrade communication services in multiple communication sites 106. The server 102 may be configured to optimize network resources 105 of the communication spectrum at each communication site location to reduce and/or eliminate downtime. Downtime in a specific communication site 106 may negatively impact devices 202 in the specific communication site 106. In some embodiments, the server 102 may be configured to update and/or modify services at a given communication site 106 by scheduling and/or managing new service releases over time. In cases in which releases of multiple services may be determined to impact one another, the server 102 may be configured to determine impacts of the multiple releases and schedule these releases to minimize an impact to the services in a given communication site 106 and the rest of the communication system 100. In this regard, updates and/or modifications to services in a given communication site 106 may be planned to reduce and/or eliminate downtime impact. The server 102 may be configured to assign network resources 105 of communication sites 106 of a same size and/or different sizes. In this regard, size of a communication site 106 may correspond to a number of devices 202 performing communication operations. In some embodiments, while a first number of devices 202*a* in a first communication site 106*a* and a second number of user devices 202*b* in a second communication site 106*b* may not be equal to one another, a first number of network resources 105 assigned to the first communication site 106*a* may be equal to a second number of network resources 105 assigned to the second communication site 106*b*. The server 102 may be configured to categorize the communication spectrum usage at the communication sites 106. As determined via the ML algorithm 156, communication sites 106 may be clustered to be modified and/or updated at once. The communication sites 106 may be grouped in a cluster when the communication sites 106 are neighboring one another (e.g., in a same vicinity as shown in FIG. 2) and/or comprise same services. In other embodiments, telemetry data 104 associated with a given communication site 106 may be obtained over time. The telemetry data 104 may comprise information indicating services to upgrade. The server 102 may be configured to determine times to upgrade the services to eliminate and/or reduce adverse effects to a quality of service (QOS) of the given communication site.

In FIG. 7A, as a non-limiting representative example, the spectrum assignments 700*a* comprise one or more assignments 152 of network resources 105 at a first time. The spectrum assignments 700*a* may be a current approach for assigning network resources 105 to the spectrum sharing system 200 of FIG. 2. In this regard, the spectrum assignments 700*a* show that the network resources 105 are assigned to the communication sites 106*a*-106*d*.

In FIG. 7B, as a non-limiting representative example, the spectrum assignments 700*b* comprise one or more assignments 152 of network resources 105 at a second time. The spectrum assignments 700*b* may be a suggested approach (e.g., as part of the spectrum assignment recommendations 103) for assigning network resources 105 to the spectrum sharing system 200 of FIG. 2. In this regard, the spectrum assignments 700*b* may comprise a release 702 configured to provide an update and/or a modification associated with the communication site 106*d*. The network resources 105 in the release 702 may be assigned during a maintenance window and/or another time in which the communication system 100 is determined to have the least impact in the traffic of the communication spectrum.

In some embodiments, the server 102 may be configured to evaluate the spectrum assignments 700*a* in FIG. 7A via the telemetry data 104*a*-104*d* at a first time. The server 102 may be configured to determine a time to perform the release 702 for one or more of the communication sites 106. The server 102 may be configured to generate one or more analysis results 140 after evaluating the telemetry data 104 in accordance with one or more ML models of the ML algorithm 156. Herein, the server 102 may be configured to generate one or more spectrum assignment recommendations 103 based on the analysis results 140. The server 102 spectrum assignment recommendations 103 may comprise one or more suggested assignments 152 to be implemented in the communication spectrum at a second time. Further, the spectrum assignments 700*b* in FIG. 7B may be one or more assignments 152 implemented in the communication spectrum to include the release 702. Herein, the release 702 is configured to allocate network resources 105 to the top two power levels of the representative communication spectrum over all the frequency levels available.

In FIG. 7C, as a non-limiting representative example, the spectrum assignments 700*c* comprise one or more assignments 152 of network resources 105 at a first time. The spectrum assignments 700*c* may be a current approach for assigning network resources 105 to the spectrum sharing system 200 of FIG. 2. In this regard, the spectrum assignments 700*c* show that the network resources 105 are assigned to the communication sites 106*a*-106*d*.

In FIG. 7D, as a non-limiting representative example, the spectrum assignments 700*d* comprise one or more assignments 152 of network resources 105 at a second time. The spectrum assignments 700*d* may be a suggested approach (e.g., as part of the spectrum assignment recommendations 103) for assigning network resources 105 to the spectrum sharing system 200 of FIG. 2. In this regard, the spectrum assignments 700*d* may comprise two releases 712 configured to provide an update and/or a modification associated with the communication site 106*a* and the communication site 106*c*. The network resources 105 in the releases 712 may be assigned during a maintenance window and/or another time in which the communication system 100 is determined to have the least impact in the traffic of the communication spectrum.

In some embodiments, the server 102 may be configured to evaluate the spectrum assignments 700*c* in FIG. 7C via the telemetry data 104*a*-104*d* at a first time. The server 102 may be configured to determine a time to perform the releases 712 for one or more of the communication sites 106. The server 102 may be configured to generate one or more analysis results 140 after evaluating the telemetry data 104 in accordance with one or more ML models of the ML algorithm 156. Herein, the server 102 may be configured to generate one or more spectrum assignment recommendations 103 based on the analysis results 140. The server 102 spectrum assignment recommendations 103 may comprise one or more suggested assignments 152 to be implemented in the communication spectrum at a second time. Further, the spectrum assignments 700*d* in FIG. 7D may be one or more assignments 152 implemented in the communication spectrum to include the releases 712. Herein, the releases 712 are configured to allocate network resources 105 to the bottom four power levels of the representative communication spectrum over all the frequency levels available.

Example Process to Implement Automatic Upgrade Scheduling and Management of Network Resources FIG. 8 illustrates an example flowchart of a process 800 to dynamically implement automatic upgrade scheduling and management of network resources 105, in accordance with one or more embodiments. In one or more embodiments, the process 800 comprises operations 802-832. Modifications, additions, or omissions may be made to the process 800. The process 800 may include more, fewer, or other operations than those shown below. For example, operations may be performed in parallel or in any suitable order. While at times discussed as the server 102, one or more of the user equipment 116, components of any of thereof, or any suitable system or components of the communication system 100 may perform one or more operations of the process 800. For example, one or more operations of the process 800 may be implemented, at least in part, in the form of server instructions 130 of FIG. 1, stored on non-transitory computer readable media, tangible media, machine-readable media (e.g., server memory 128 of FIG. 1 operating as a non-transitory computer readable medium) that when run by one or more processors (e.g., the server processor 120 of FIG. 1) may cause the one or more processors to perform operations described in operations 802-832 of the process 800. The process 800 may be performed during a maintenance window or outside a maintenance window in which the communication sites 106 may operate at low traffic.

The process 800 starts at operation 802, where the server 102 monitors first network resources 105 assigned in a communication spectrum for multiple communication sites 106 (e.g., one or more of the communication sites 106*a*-106*d* described in reference to FIG. 2) over a first period of time. At operation 804, the server 102 is configured to obtain spectrum resource assignment information 150 for the communication sites 106*a*-16*d*. At operation 806, the server 102 is configured to obtain telemetry data 104 for at least one communication site 106 of the communication sites 106*a*-16*d*. At operation 808, the server 102 is configured to analyze the spectrum resource assignment information 150 based on the telemetry data 104 and one or more communication conditions 158 after executing an ML algorithm 156. At operation 810, the server 102 is configured to generate multiple analysis results 140 in response to analyzing the spectrum resource assignment information 150. At operation 812, the server 102 is configured to receive a request 132 to provide a service release (e.g., updates and/or modification to services) to the at least one communication site 106.

The process 800 continues to operation 820, where the server 102 is configured to determine whether there are any possible available release windows in the communication spectrum. If the server 102 determines that there are any possible available release windows in the communication spectrum (i.e., YES), the process 800 proceeds to operation 822. At operation 822, the server 102 determines a release window based on the analysis results 140 after executing the ML algorithm 156. At operation 824, the server 102 is configured to generate spectrum assignment recommendations 103 based on the analysis results 140 and the request 132. At operation 826, the server 102 stores the spectrum assignment recommendations 103. The process 800 proceeds to operation 828. The process 800 may conclude at operation 828. At operation 828, the server 102 is configured to assign second network resources 105 in the communication spectrum for the communication sites 106*a*-106*d* over a second period of time in accordance with the spectrum assignment recommendations 103.

If the server 102 determines that there are no possible available release windows in the communication spectrum (i.e., NO), the process 800 proceeds to operation 832. The process 800 may conclude at operation 832. At operation 832, the server 102 is configured to generate a report 160 indicating that there are no release windows available in the communication spectrum.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:

a memory operable to store:

a machine learning algorithm configured to analyze and structure information about resources assigned in a communication spectrum; and a processor communicatively coupled to the memory and configured to:

monitor a first plurality of resources assigned in the communication spectrum for a plurality of communication sites over a first period of time;

obtain spectrum resource assignment information for the plurality of communication n sites, the spectrum resource assignment information being representative of the first plurality of resources assigned in the communication spectrum over the first period of time;

obtain telemetry data for at least one communication site of the plurality of communication sites, the telemetry data comprising one or more characteristics relating to traffic in the at least one communication site;

in response to obtaining the telemetry data, execute the machine learning algorithm to:

analyze the spectrum resource assignment information and the telemetry data based at least in part upon a first plurality of communication conditions; and in response to analyzing the spectrum resource assignment information and the telemetry data, generate a plurality of analysis results;

receive a first request to provide a first service release to the at least one communication site, the first request comprising a first tenant profile associated with the at least one communication site; and in response to receiving the first request, further execute the machine learning algorithm to:

determine a first release window based at least in part upon the plurality of analysis results, the first release window being a second period of time in which the at least one communication site operates at low traffic;

generate a first plurality of spectrum assignment recommendations based at least in part upon the plurality of analysis results, the first plurality of spectrum assignment recommendations associating a first portion of the communication spectrum with the first service release; and assign a second plurality of resources in the communication spectrum for the plurality of communication sites over the second period of time in accordance with the first plurality of spectrum assignment recommendations.

2. The apparatus of claim 1, wherein the processor is further configured to:

receive a second request to provide a second service release to the at least one communication site, the second request comprising a second tenant profile associated with the at least one communication site; and in response to receiving the second request, execute the machine learning algorithm to:

determine a second release window based at least in part upon the plurality of analysis results, the second release window being a third period of time in which the at least one communication site operates at low traffic;

generate a second plurality of spectrum assignment recommendations based at least in part upon the plurality of analysis results, the second plurality of spectrum assignment recommendations associating a second portion of the communication spectrum with the first service release; and assign a third plurality of resources in the communication spectrum for the plurality of communication sites over the third period of time in accordance with the second plurality of spectrum assignment recommendations.

3. The apparatus of claim 2, wherein the second period of time and the third period of time are different from one another.

4. The apparatus of claim 2, wherein the second period of time and the third period of time overlap with one another.

5. The apparatus of claim 1, wherein the second plurality of resources in the communication spectrum for the plurality of communication sites are assigned over the second period of time in accordance with the first plurality of spectrum assignment recommendations to maintain a spectral efficiency of four bits per second per hertz on the communication spectrum.

6. The apparatus of claim 1, wherein the first plurality of communication conditions is updated periodically over time.

7. The apparatus of claim 1, wherein the first plurality of communication conditions is updated dynamically over time.

8. A method, comprising:

monitoring a first plurality of resources assigned in a communication spectrum for a plurality of communication sites over a first period of time;

obtaining spectrum resource assignment information for the plurality of communication sites, the spectrum resource assignment information being representative of the first plurality of resources assigned in the communication spectrum over the first period of time;

obtaining telemetry data for at least one communication site of the plurality of communication sites, the telemetry data comprising one or more characteristics relating to traffic in the at least one communication site;

in response to obtaining the telemetry data, executing a machine learning algorithm to perform one or more operations comprising:

analyzing the spectrum resource assignment information and the telemetry data based at least in part upon a first plurality of communication conditions; and in response to analyzing the spectrum resource assignment information and the telemetry data, generating a plurality of analysis results;

receiving a first request to provide a first service release to the at least one communication site, the first request comprising a first tenant profile associated with the at least one communication site; and in response to receiving the first request, executing the machine learning algorithm to further perform one or more first additional operations comprising:

determining a first release window based at least in part upon the plurality of analysis results, the first release window being a second period of time in which the at least one communication site operates at low traffic;

generating a first plurality of spectrum assignment recommendations based at least in part upon the plurality of analysis results, the first plurality of spectrum assignment recommendations associating a first portion of the communication spectrum with the first service release; and assigning a second plurality of resources in the communication spectrum for the plurality of communication sites over the second period of time in accordance with the first plurality of spectrum assignment recommendations.

9. The method of claim 8, further comprising:

receiving a second request to provide a second service release to the at least one communication site, the second request comprising a second tenant profile associated with the at least one communication site; and in response to receiving the second request, executing the machine learning algorithm to further perform one or more second additional operations comprising:

determining a second release window based at least in part upon the plurality of analysis results, the second release window being a third period of time in which the at least one communication site operates at low traffic;

generating a second plurality of spectrum assignment recommendations based at least in part upon the plurality of analysis results, the second plurality of spectrum assignment recommendations associating a second portion of the communication spectrum with the first service release; and assigning a third plurality of resources in the communication spectrum for the plurality of communication sites over the third period of time in accordance with the second plurality of spectrum assignment recommendations.

10. The method of claim 9, wherein the second period of time and the third period of time are different from one another.

11. The method of claim 9, wherein the second period of time and the third period of time overlap with one another.

12. The method of claim 8, wherein the second plurality of resources in the communication spectrum for the plurality of communication sites are assigned over the second period of time in accordance with the first plurality of spectrum assignment recommendations to maintain a spectral efficiency of four bits per second per hertz on the communication spectrum.

13. The method of claim 8, wherein the first plurality of communication conditions is updated periodically over time.

14. The method of claim 8, wherein the first plurality of communication conditions is updated dynamically over time.

15. A non-transitory computer readable medium storing instructions that when executed by a processor cause the processor to:

monitor a first plurality of resources assigned in a communication spectrum for a plurality of communication sites over a first period of time;

obtain spectrum resource assignment information for the plurality of communication sites, the spectrum resource assignment information being representative of the first plurality of resources assigned in the communication spectrum over the first period of time;

obtain telemetry data for at least one communication site of the plurality of communication sites, the telemetry data comprising one or more characteristics relating to traffic in the at least one communication site;

in response to obtaining the telemetry data, execute a machine learning algorithm to:

analyze the spectrum resource assignment information and the telemetry data based at least in part upon a first plurality of communication conditions; and in response to analyzing the spectrum resource assignment information and the telemetry data, generate a plurality of analysis results;

receive a first request to provide a first service release to the at least one communication site, the first request comprising a first tenant profile associated with the at least one communication site; and in response to receiving the first request, further execute the machine learning algorithm to:

determine a first release window based at least in part upon the plurality of analysis results, the first release window being a second period of time in which the at least one communication site operates at low traffic;

generate a first plurality of spectrum assignment recommendations based at least in part upon the plurality of analysis results, the first plurality of spectrum assignment recommendations associating a first portion of the communication spectrum with the first service release; and assign a second plurality of resources in the communication spectrum for the plurality of communication sites over the second period of time in accordance with the first plurality of spectrum assignment recommendations.

16. The non-transitory computer readable medium of claim 15, the processor being further caused to:

receive a second request to provide a second service release to the at least one communication site, the second request comprising a second tenant profile associated with the at least one communication site; and in response to receiving the second request, further execute the machine learning algorithm to:

determine a second release window based at least in part upon the plurality of analysis results, the second release window being a third period of time in which the at least one communication site operates at low traffic;

generate a second plurality of spectrum assignment recommendations based at least in part upon the plurality of analysis results, the second plurality of spectrum assignment recommendations associating a second portion of the communication spectrum with the first service release; and assign a third plurality of resources in the communication spectrum for the plurality of communication sites over the third period of time in accordance with the second plurality of spectrum assignment recommendations.

17. The non-transitory computer readable medium of claim 16, wherein the second period of time and the third period of time are different from one another.

18. The non-transitory computer readable medium of claim 16, wherein the second period of time and the third period of time overlap with one another.

19. The non-transitory computer readable medium of claim 15, wherein the second plurality of resources in the communication spectrum for the plurality of communication sites are assigned over the second period of time in accordance with the first plurality of spectrum assignment recommendations to maintain a spectral efficiency of four bits per second per hertz on the communication spectrum.

20. The non-transitory computer readable medium of claim 15, wherein the first plurality of communication conditions is updated periodically over time.

* * * * *